(12) United States Patent
Misra et al.

(10) Patent No.: US 10,986,218 B2
(45) Date of Patent: Apr. 20, 2021

(54) BROADCAST SYSTEM WITH A WATERMARK PAYLOAD

(71) Applicant: Sharp Kabushiki Kaisha, Sakai (JP)

(72) Inventors: Kiran M. Misra, Camas, WA (US); Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/554,308

(22) PCT Filed: Apr. 26, 2016

(86) PCT No.: PCT/JP2016/002206
§ 371 (c)(1),
(2) Date: Aug. 29, 2017

(87) PCT Pub. No.: WO2016/174869
PCT Pub. Date: Nov. 3, 2016

(65) Prior Publication Data
US 2018/0048743 A1 Feb. 15, 2018

Related U.S. Application Data

(60) Provisional application No. 62/154,691, filed on Apr. 29, 2015, provisional application No. 62/158,705, filed on May 8, 2015.

(51) Int. Cl.
| | |
|---|---|
| *H04L 29/08* | (2006.01) |
| *H04N 21/2389* | (2011.01) |
| *H04N 21/435* | (2011.01) |
| *H04N 21/44* | (2011.01) |

(52) U.S. Cl.
CPC ..... *H04L 69/324* (2013.01); *H04N 21/23892* (2013.01); *H04N 21/435* (2013.01); *H04N 21/44008* (2013.01); *H04L 67/02* (2013.01)

(58) Field of Classification Search
None
See application file for complete search history.

(56) References Cited

U.S. PATENT DOCUMENTS

| | | |
|---|---|---|
| 5,548,532 A | 8/1996 | Menand et al. |
| 2003/0159101 A1* | 8/2003 | Hyland .................. G06F 11/10 714/781 |
| 2004/0196926 A1 | 10/2004 | Chien et al. |

(Continued)

FOREIGN PATENT DOCUMENTS

WO 2009/008682 A1 1/2009

*Primary Examiner* — Chi H Pham
*Assistant Examiner* — Raul Rivas
(74) *Attorney, Agent, or Firm* — ScienBiziP, P.C.

(57) ABSTRACT

A system for broadcasting that includes a watermark payload. The system includes a method for receiving a set of message fragments, receiving a 32 bit Cyclic Redundancy Check for each message fragment, identifying whether a last fragment is more than zero, and receiving the 32 bit Cyclic Redundancy Check included in the last fragment, if the value of the last fragment is more than zero, in which the 32 bit Cyclic Redundancy Check contains a CRC value represented by CRC(x), in which x is obtained by concatenating the message fragments and the 32 bit Cyclic Redundancy Check is sent using an unsigned integer most significant bit first format.

2 Claims, 23 Drawing Sheets

(56) References Cited

U.S. PATENT DOCUMENTS

| | | | |
|---|---|---|---|
| 2009/0019337 A1* | 1/2009 | Pi | H04L 1/004 714/758 |
| 2015/0358507 A1* | 12/2015 | Eyer | H04N 21/8547 348/515 |
| 2017/0048022 A1* | 2/2017 | Kaino | H04L 1/0045 |
| 2019/0132652 A1* | 5/2019 | Zhao | H04N 21/2389 |

* cited by examiner

| Z | MMMM | SSSS | IIIIIIIIIIIIIIIIIIIIIIIIIIIIIII | RR | A | D | LLLL |
|---|---|---|---|---|---|---|---|
| 0 | 1  4 | 5  8 | 9                            40 | 41 42 | 43 | 44 | 45  49 |

FIG. 12

| | $b_7$ | $b_6$ | $b_5$ | $b_4$ | $b_3$ | $b_2$ | $b_1$ | $b_0$ |
|---|---|---|---|---|---|---|---|---|
| | 0 | 0 | 0 | 1 | 0 | 0 | 0 | 0 |
| | 1 | 0 | 0 | 1 | 1 | 0 | 0 | 0 |
| | $T_1$ | $T_0$ | pr | $L_4$ | $L_3$ | $L_2$ | $L_1$ | $L_0$ |
| | $cid_7$ | $cid_6$ | $cid_5$ | $cid_4$ | $cid_3$ | $cid_2$ | $cid_1$ | $cid_0$ |
| | | | | SDO_payload ( ) | | | | ← Variable length |

FIG. 13

| cmdID value | Meaning |
|---|---|
| 0x05 | Watermark based interactive services trigger (TDO model) |
| 0x06 | Watermark based interactive services trigger (Direct execution model) |
| 0x07 | Watermark based location of profile, demographics, interest (PDI) table |
| 0x08 | Watermark based location of audience data server |
| 0x09 | Watermark based base URL for Internet delivery of signaling and announcements |

FIG. 14

BROADCAST SYSTEM WITH A WATERMARK PAYLOAD

TECHNICAL FIELD

The present invention relates generally to a system with audio-visual content watermarking.

BACKGROUND ART

In many digital broadcasting systems, a broadcasting station transmits both streams of audio-visual (AV) content and one or more enhanced service data. The enhanced service data may be provided with the AV content to provide information and services or may be provided separately from the AV content to provide information and services.

In many broadcasting environments, the audio-visual content and the one or more enhanced service data is not received directly by an AV presentation device from the broadcasting station. Rather the AV presentation device, such as a television, is typically connected to a broadcast receiving device that receives the audio-visual content and the one or more enhanced service data in a compressed form and provides uncompressed audio-visual content to the AV presentation device.

In some broadcasting environments, the broadcast receiving device receives audio-visual content from a server (sometimes referred to as a Multichannel Video Programming Distributor (MVPD)). The MVPD receives an audio-visual broadcast signal from the broadcasting station, extracts content from the received audio-visual broadcast signal, converts the extracted content into audio-visual signals having a suitable format for transmission, and provides the converted audio-visual signals to the broadcast receiving device. During the conversion process, the MVPD often removes the enhanced service data provided from the broadcasting station or may incorporate a different enhanced service data that is provided to the broadcast receiving device. In this manner, the broadcasting station may provide the audio-visual content with enhanced service data, but the enhanced service data, if any, that is ultimately provided to the AV presentation device and/or the broadcast receiving device may not be the same as that provided by the broadcasting station.

Since the broadcast receiving device extracts audio-visual content from the signal received from the MVPD and provides only uncompressed audio-visual data to the AV presentation device, only enhanced service data provided to the broadcast receiving device is available. Furthermore, the same enhanced service data provided by the broadcasting station may not be provided to the broadcast receiving device and/or AV presentation device.

SUMMARY OF INVENTION

Technical Problem

The foregoing and other objectives, features, and advantages of the invention will be more readily understood upon consideration of the following detailed description of the invention, taken in conjunction with the accompanying drawings.

Solution to Problem

According to the present invention, there is provided a method for receiving information, the method comprising: (a) identifying whether the number of message fragments is more than zero; (b) receiving a 32 bit Cyclic Redundancy Check (CRC) included in a last fragment, wherein the 32 bit CRC contains a CRC value represented by CRC(x), wherein x is obtained by concatenating $x_1, x_2, \ldots, x_n$ in a case that the number of message fragment is more than zero.

BRIEF DESCRIPTION OF DRAWINGS

FIG. 12 illustrates another watermark payload.

FIG. 13 illustrates SDO Private Data.

FIG. 14 illustrates metadata encapsulated within SDO Private data as SDO Payload using cmdID's.

DESCRIPTION OF EMBODIMENTS

Figure 1:
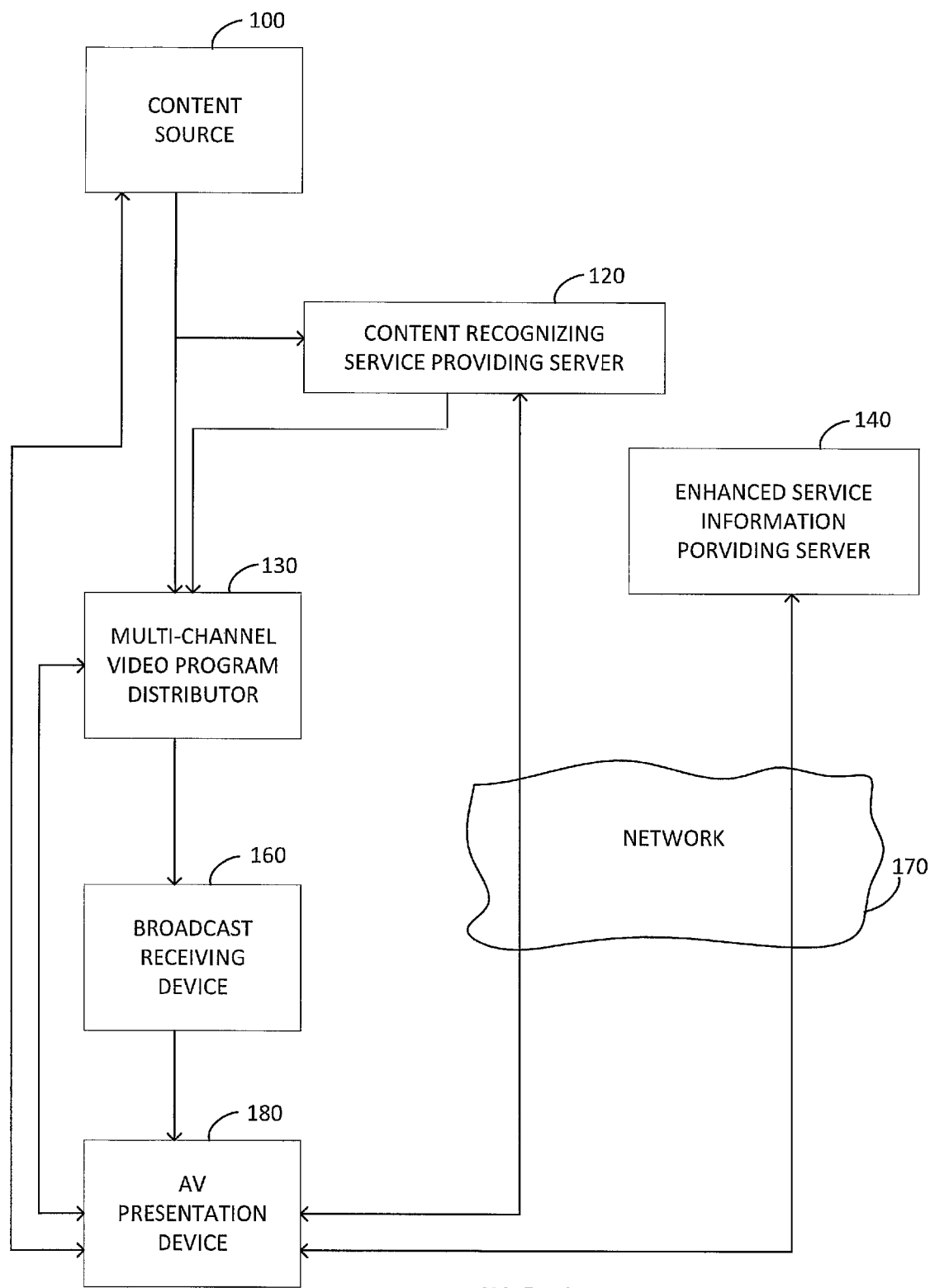
FIG. 1 illustrates a system with enhanced service information.

Referring to FIG. 1, the system may include a content source 100, a content recognizing service providing server 120, a multi-channel video program distributor 130, an enhanced service information providing server 140, a broadcast receiving device 160, a network 170, and an AV presentation device 180.

The content source 100 may correspond to a broadcasting station that broadcasts a broadcast signal including one or more streams of audio-visual content (e.g., audio and/or video). The broadcast signal may further include enhanced services data and/or signaling information. The enhanced services data preferably relates to one or more of the audio-visual broadcast streams. The enhanced data services may have any suitable format, such as for example, service information, metadata, additional data, compiled execution files, web applications, Hypertext Markup Language (HTML) documents, XML documents, Cascading Style Sheet (CSS) documents, audio files, video files, ATSC 2.0 or future versions contents, and addresses such as Uniform Resource Locator (URL).

The content recognizing service providing server 120 provides a content recognizing service that allows the AV presentation device 180 to recognize content on the basis of audio-visual content from the content source 100. The content recognizing service providing server 120 may optionally modify the audio-visual broadcast content, such as by including a watermark.

The content recognizing service providing server 120 may include a watermark inserter. The watermark inserter may insert watermarks which are designed to carry enhanced services data and/or signaling information, while being imperceptible or at least minimally intrusive to viewers. In other cases a readily observable watermark may be inserted (e.g., readily observable may be readily visible in the image and/or readily observable may be readily audible in the audio). For example, the readily observable watermark may be a logo, such as a logo of a content provider at the upper-left or upper-right of each frame.

The content recognizing service providing server 120 may include a watermark inserter that modifies the audio-visual content to include a non-readily observable watermark (e.g., non-readily observable may be readily non-visible in the image and/or non-readily observable may be non-readily audible in the audio). For example, the non-readily observable watermark may include security information, tracking information, data, or otherwise. Another example includes the channel, content, timing, triggers, and/or URL information.

The multi-channel video program distributor 130 receives broadcast signals from one or more broadcasting stations and typically provides multiplexed broadcast signals to the broadcast receiving device 160. The multi-channel video program distributor 130 may perform demodulation and channel decoding on the received broadcast signals to extract the audio-visual content and enhanced service data. The multi-channel video program distributor 130 may also perform channel encoding on the extracted audio-visual content and enhanced service data to generate a multiplexed signal for further distribution. The multi-channel video program distributor 130 may exclude the extracted enhanced service data and/or may include a different enhanced service data.

The broadcast receiving device 160 may tune to a channel selected by a user and receive an audio-visual signal of the tuned channel. The broadcast receiving device 160 typically performs demodulation and channel decoding on the received signal to extract desired audio-visual content. The broadcast receiving device 160 decodes the extracted audio-visual content using any suitable technique, such as for example, H.264/Moving Picture Experts Group-4 advanced video coding (MPEG-4 AVC), H.265/High efficiency video coding (HEVC), Dolby AC-3, and Moving Picture Experts Group-2 Advanced Audio Coding (MPEG-2 AAC). The broadcast receiving device 160 typically provides uncompressed audio-visual content to the AV presentation device 180.

The enhanced service information providing server 140 provides enhanced service information to audio-visual content in response to a request from the AV presentation device 180.

The AV presentation device 180 may include a display, such as for example, a television, a notebook computer, a mobile phone, and a smart phone. The AV presentation device 180 may receive uncompressed (or compressed) audio-visual or video or audio content from the broadcast receiving device 160, a broadcast signal including encoded audio-visual or video or audio content from the content source 100, and/or encoded or decoded audio-visual or video or audio content from the multi-channel video program distributor 130. In some cases the uncompressed video and audio, may be received via an HDMI cable. The AV presentation device 180 may receive from the content recognizing service providing server 120 through the network 170, an address of an enhanced service relating to the audio-visual content from the enhanced service information providing server 140.

It is to be understood that the content source 100, the content recognizing service providing server 120, the multi-channel video program distributor 130, and the enhanced service information providing server 140 may be combined, or omitted, as desired. It is to be understood that these are logical roles. In some case some of these entities may be separate physical devices. In other cases some of these logical entities may be embodied in same physical device. For example, the broadcast receiving device 160 and AV presentation device 180 may be combined, if desired.

Figure 2:
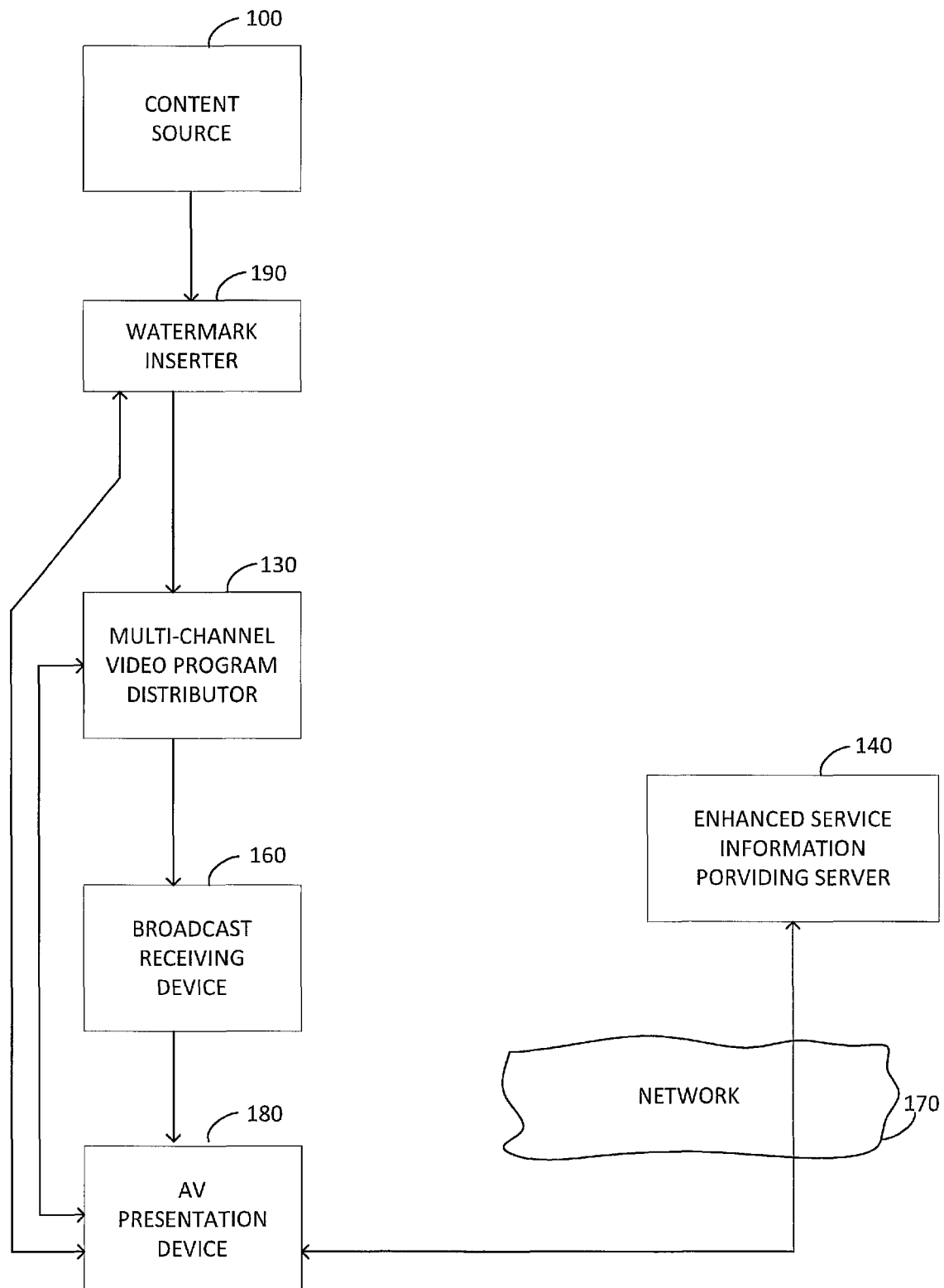
FIG. 2 illustrates another system with enhanced information.

Referring to FIG. 2, a modified system may include a watermark inserter 190. The watermark inserter 190 may modify the audio-visual (e.g., the audio and/or video) content to include additional information in the audio-visual content. The multi-channel video program distribution 130 may receive and distribute a broadcast signal including the modified audio-visual content with the watermark.

The watermark inserter 190 preferably modifies the signal in a manner that includes additional information which is non-readily observable (e.g., visually and/or audibly) in the form of digital information. In non-readily observable watermarking, the inserted information may be readily identifiable in the audio and/or video. In non-readily observable watermarking, although information is included in the audio-visual content (e.g., the audio and/or video), a user is not readily aware of the information.

One use for the watermarking is copyright protection for inhibiting illegal copying of digital media. Another use for the watermarking is source tracking of digital media. A further use for the watermarking is descriptive information for the digital media. Yet another use for the watermarking is providing location information for where additional content may be received associated with the digital media. Yet another use is to identify content and content source that is being viewed and the current time point in the content, and then allowing the device to access the desired additional functionality via an Internet connection. The watermark information is included within the audio-visual content itself, as distinguished from, meta-data that is delivered along with the audio-visual content. By way of example, the watermark information may be included by using a spread spectrum technique, a quantization technique, and/or an amplitude modulation technique.

Figure 3:
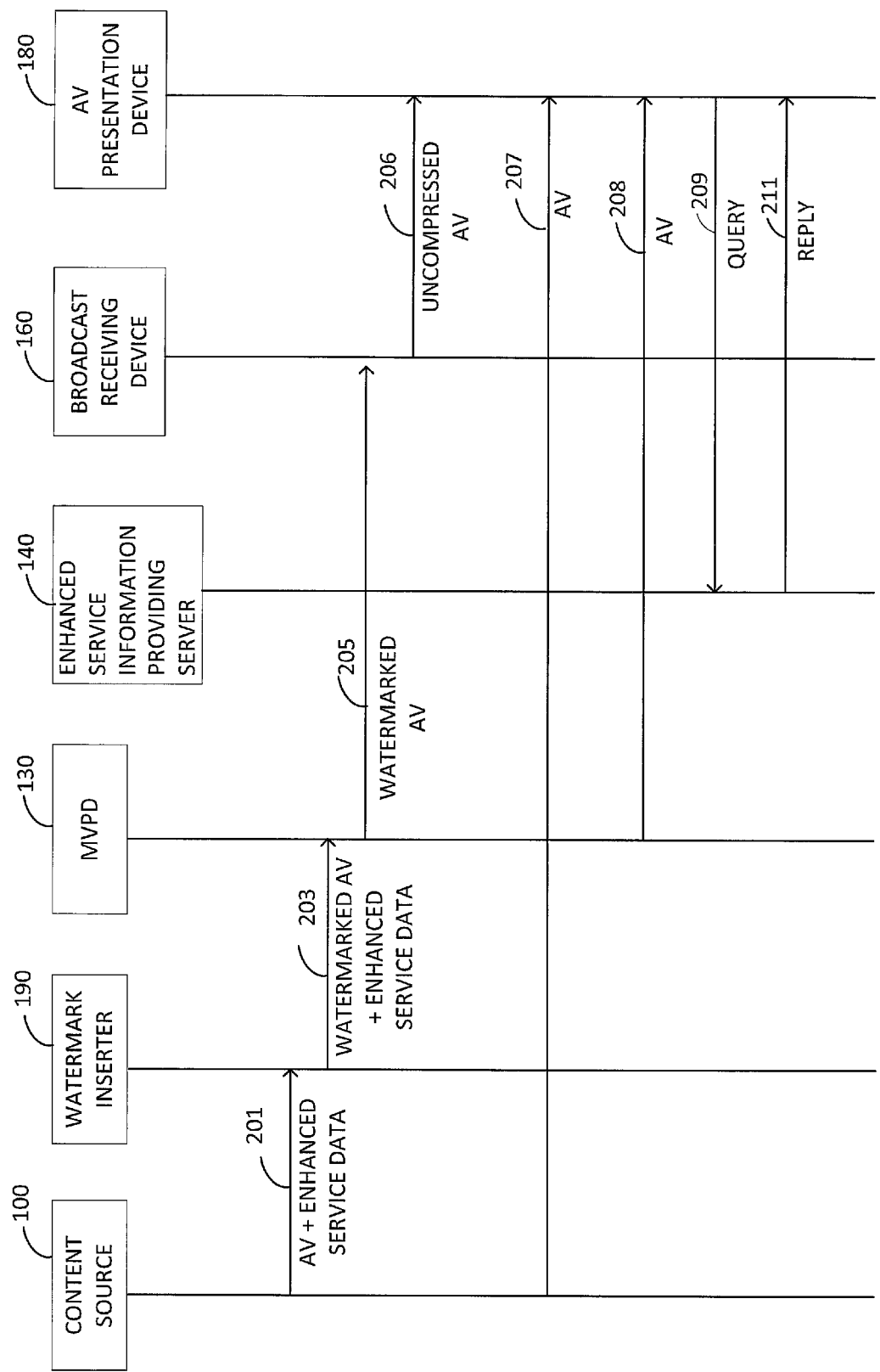
FIG. 3 illustrates a data flow for a system with enhanced information.

Referring to FIG. 3, an exemplary data flow is illustrated. The content source 100 transmits a broadcast signal including at least one audio-visual content and an enhanced service data 201 to the watermark inserter 190.

The watermark inserter 190 receives the broadcast signal that the content source 100 provides and includes a readily observable and/or a non-readily observable watermark in the audio-visual content. The modified audio-visual content with the watermark is provided together with enhanced service data 203 to the MVPD 130.

The content information associated with the watermark may include, for example, identification information of a content provider that provides audio-visual content, audio-visual content identification information, time information of a content section used in content information acquisition, names of channels through which audio-visual content is broadcasted, logos of channels through which audio-visual content is broadcasted, descriptions of channels through which the audio-visual content is broadcasted, a usage information reporting period, the minimum usage time for usage information acquisition, statistics for sporting events, display of useful information, widgets, applications, executables, and/or available enhanced service information relating to audio-visual content.

The acquisition path of available enhanced service data may be represented in any manner, such an Internet Protocol based path or Advanced Television Systems Committee—Mobile/Handheld (ATSC M/H).

The MVPD 130 receives broadcast signals including watermarked audio-visual content and enhanced data service and may generate a multiplexed signal to provide it 205 to the broadcast receiving device 160. At this point, the multiplexed signal may exclude the received enhanced service data and/or may include a different enhanced service data.

The broadcast receiving device 160 may tune to a channel that a user selects and receives signals of the tuned channel, demodulates the received signals, performs channel decoding and audio-video decoding on the demodulated signals to generate an uncompressed audio-video content, and then, provide 206 the uncompressed audio-visual content to the AV presentation device 180. The content source 100 may also broadcast 207 the audio-visual content through a channel to the AV presentation device 180. The MVPD 130 may directly transmit 208 a broadcast signal including audio-visual content to the AV presentation device 180 without going through the broadcast receiving device 160. In yet another case some of the AV information may be sent to the AV presentation device 180 over a broadband connection. In some cases this may be a managed broadband connection. In another case it may be an unmanaged broadband connection.

The AV presentation device 180 may receive uncompressed (or compressed) audio-visual content from the broadcast receiving device 160. Additionally, the AV presentation device 180 may receive a broadcast signal through a channel from the content source 100, and then, may demodulate and decode the received broadcast signal to obtain audio-visual content. Additionally, the AV presentation device 180 may receive a broadcast signal from the MVPD 130, and then, may demodulate and decode the received broadcast signal to obtain audio-visual content. The AV presentation device 180 (or broadcast receiving device 160) extracts watermark information from one or more video frames or a selection of audio samples of the received audio-visual content. The AV presentation device 180 may use the information obtained from the watermark(s) to make a request 209 to the enhanced service information providing server 140 (or any other device) for additional information. The enhanced service information providing server 140 may provide, in response thereto a reply 211.

Figure 4:
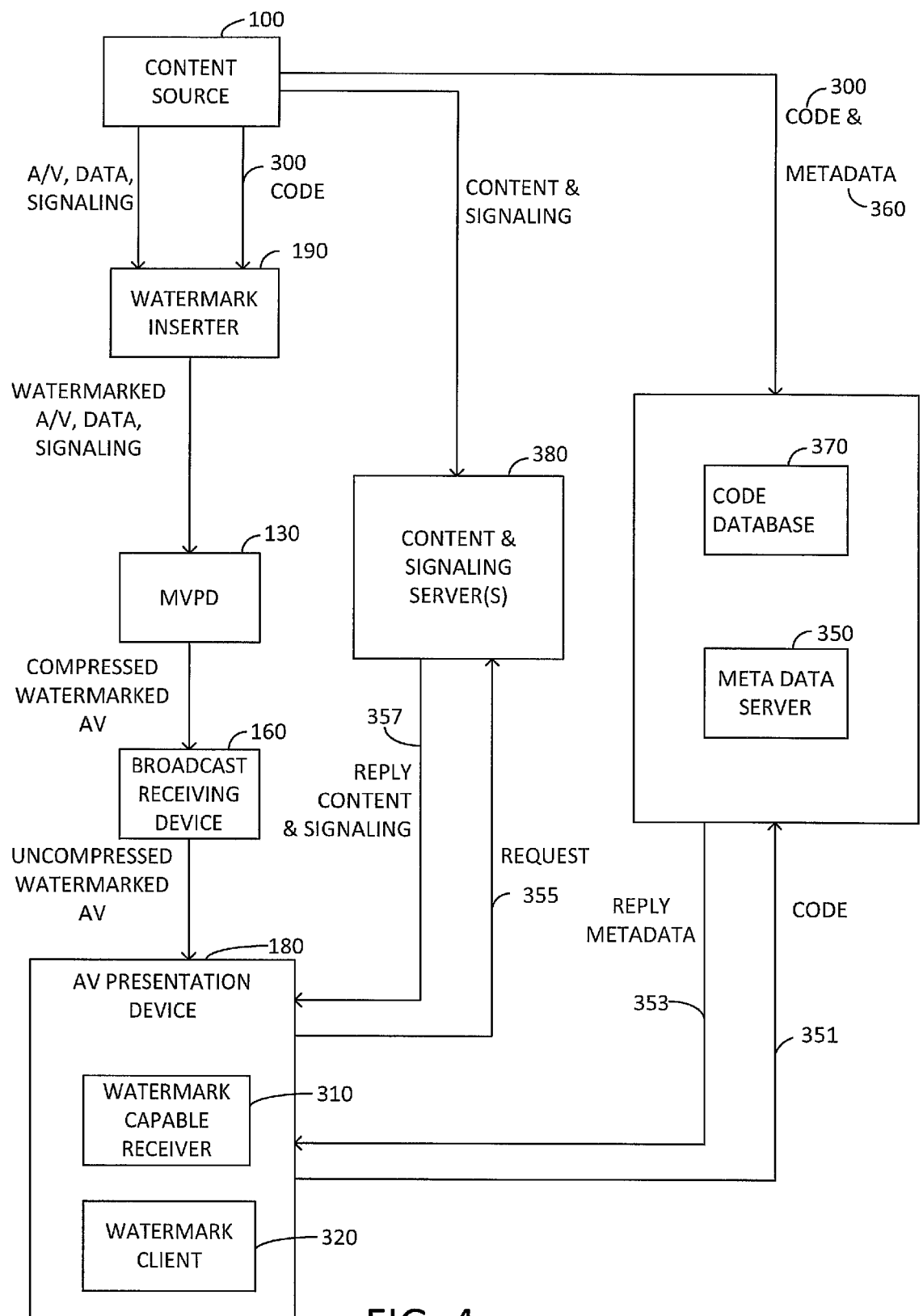
FIG. 4 illustrates another system with enhanced information.

Referring to FIG. 4, a further embodiment includes the content source 100 that provides audio-visual content together with enhanced service data (if desired) to the watermark inserter 190. In addition, the content source 100 may provide a code 300 to the watermark inserter 190 together with the audio-visual content. The code 300 may be any suitable code to identify which, among a plurality of audio-visual streams, should be modified with the watermark. For example code=1 may identify the first audio-visual stream, code=2 may identify the second audio-visual stream, code=3 may identify the fourth audio-visual stream from ABC, code=4 may identify the fourth audio-visual stream from NBC, etc. The code may include temporal location information within the audio-visual content. The code may include other metadata, if desired.

The watermarked audio-visual content and associated data, signaling is provided by the watermark inserter 190 to the MVPD, which in turn may provide the watermarked compressed audio-visual content to the broadcast receiving device 160 (e.g., a set top box). The broadcast receiving device 160 may provide watermarked audio-visual content (e.g., typically uncompressed) to the AV presentation device 180. The AV presentation device 180 may include a watermark capable receiver 310 together with a watermark client 320. The watermark capable receiver 310 is suitable to detect the existence of the watermark within the audio-visual content, and to extract the watermark data from within the audio-visual content. The watermark client 320 is suitable to use the data extracted from the watermark to request additional data based thereon, and subsequently use this additional data in a suitable manner.

The AV presentation device 180 may use the code 300 from the extracted watermark to make a request to a metadata server 350. A code database 370 receives the data from the content source 100 that includes the code 300 and associated metadata 360. The code 300 and associated metadata 360 is stored in the code database 370 for subsequent use. In this manner, the code 300 that is provided to the watermark inserter 190 which is encoded within the audio-visual content is also stored in the code database 370 together with its associated metadata 360. In the event that the MVPD 130, or otherwise, removes the associated metadata or otherwise changes the associated metadata, it is recoverable by the AV presentation device 180 from the metadata server 350 which uses the provided code 351 to query the code database 370 and provide an associated response with the metadata 353 to the AV presentation device 180. The reply metadata provided by the metadata server 350 is used by the AV presentation device 180 to form a request 355 that is provided to the content and signaling server 380. The content and signaling server 380, in response to the request, provides selected content and signaling 357 to the AV presentation device 180. In general, the content and signaling server 380 may be different from the metadata server 350.

However, making a first request to the metadata server to obtain a response to the code provided, then subsequently using the metadata to provide a request to the content and signaling server 380 is burdensome, and prone to failure, due to the two different servers and/or requests that are utilized. Additionally it may increase the latency.

By way of example, the metadata may consist of one or more of the following syntax elements:
 (1) location of content and signaling server (e.g., where is the server, such as its network address. Examples of network addresses are domain names, IPv4 address etc.);
 (2) protocol to be used for communication with the content and signaling server (e.g., Hypertext Transfer Protocol-http, Hypertext Transfer Protocol Secure-https etc.);
 (3) time code identifying a temporal location in the audio-visual content (e.g., where the metadata should be associated with in the audio-visual content);
 (4) time sensitive event trigger (e.g., an advertisement or an event for a particular location in the audio-visual content);
 (5) channel identification (e.g., channel specific information; local channel content);

(6) duration over which the content and signaling server requests are randomly carried out by client (e.g., for load balancing). For brevity, this syntax element may also be referred to as duration for content server requests;

(7) etc.

The watermark(s) embedded in the audio-video content typically have a capacity to carry only a few bits of payload information when the watermarked audio-video broadcast has non-readily observable information. For relatively small payload sizes, the time code (element 3 above) and/or the location of the content and signaling server (element 1 above) tends to take on a significant percentage of the available payload leaving limited additional payload for the remaining data, which tends to be problematic.

To include sufficient metadata within the watermark, so that both the time code and the location information may be provided together with additional information, it may be desirable to partition the metadata across multiple watermark payloads. Each of the watermark payloads is likewise preferably included within different portions of the audio-visual content. The data extracted from the multiple watermark payloads are combined together to form a set of desirable information to be used to make a request. In the description below the term payload may be used to indicate watermark payload. Each of the syntax elements may be included within a single payload, spanned across multiple payloads, and/or fragmented across multiple payloads. Each payload may be assigned a payload type for purposes of identification. Further, an association may be established between multiple payloads belonging to the same or approximately the same timeline location. Also, the association may be uni-directional or bi-directional, as desired.

The desired time code data may be obtained from payload(s) that span across several temporal locations of the audio-visual content. Therefore some systems may establish rules to associate the determined time code with a particular temporal location of the audio-visual content. In an example embodiment the chosen temporal location may correspond to the temporal location at the end of a pre-determined watermark payload.

For example, the payload size may be 50 bits while the desirable metadata may be 70 bits, thus exceeding the payload size of a single watermark. An example of the desirable metadata may be as follows:

| | |
|---|---|
| Location of content and server (I) | 32 bits (Internet Protocol "IP" address) |
| Application layer protocol (A) | 1 bit (http/https) |
| Time code (T) | 25 bits (for 1 year of uniqueness with a granularity of 1 second) |
| Time sensitive trigger (D) | 1 bit (A value of 1 indicates the AV presentation device should query for interactive content. A value of 0 indicates the AV presentation device should not query for interactive content (e.g. as in time base trigger)). |
| Channel identification (L) | 9 bits |
| Duration for content server requests (R) | 2 bits |

Another example of the desirable metadata may be as follows:

| | |
|---|---|
| Location of content and server (I) | 32 bits (IP address) |
| Application layer protocol (A) | 2 bit (00 = http/01 = https, 10 = reserved, 11 = reserved) |
| Time code (T) | 25 bits (for 1 year of uniqueness with a granularity of 1 second) |
| Time sensitive trigger (D) | 1 bit |
| Channel identification (L) | 9 bits |
| Duration for content server requests (R) | 2 bits |

One manner of partitioning the metadata is to include the content and signal server communication information (CSSCI) in one payload and timeline information in another payload. The CSSCI payload may include, for example, where information (e.g., location of content and signaling server), association information (e.g., an identifier to associate the CSSCI payload with one or more other payloads), and how information (e.g., application layer protocol, duration for content server requests). The timeline information may include, for example, association information (e.g., an identifier to associate the timeline with one or more other payloads), when information (e.g., time code information), and which information (e.g., channel identification).

Figure 5:
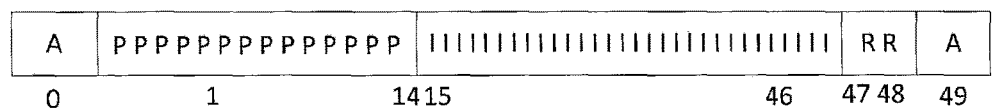
FIG. 5 illustrates a watermark payload.

Referring to FIG. 5, an exemplary CSSCI payload is illustrated.

Figure 6:
FIG. 6 illustrates another watermark payload.

Referring to FIG. 6, an exemplary time location payload is illustrated. The term time location may be alternatively used in place of the term temporal location.

The payload type may be identified by the first bit, "Y". When Y is set to 0 the payload corresponds to CSSCI payload and the 14 bit payload identifier (P) is used to label the CSSCI. When Y is set to 1 the payload corresponds to the temporal location payload and the 14 bit payload identifier (P) signals the corresponding CSSCI. As a result, different payload types with same payload identifier (P) value are associated with each other. The identifier R indicates a time duration over which to spread the content and signaling server requests. In yet another example embodiment "Y" may correspond to a 2-bit field where the value 00 indicates a CSSCI payload, the value 01 indicates a temporal location payload and the values 10, 11 are reserved for future use.

Figure 7:
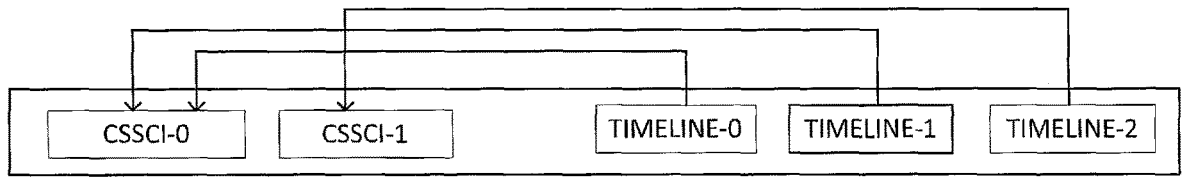
FIG. 7 illustrates relationships between watermark payloads.

Referring to FIG. 7, an exemplary time line is illustrated. A first CSSCI type payload (e.g., CSSCI-0) has a first set of association information P while a second CSSCI type payload (e.g., CSSCI-1) has a second different set of association information P. Having two different association information P for CSSCI-0 and CSSCI-1 distinguish between and identify the two CSSCI payloads. A first time location payload (e.g., Timeline-0) has the first set of association information P that matches the association information P for CSSCI-0, a second time location payload (e.g., Timeline-1) has the same first set of association information P that matches the association information P for CSSCI-0, a third time location payload (e.g., Timeline-2) has the same second set of association information P that matches the association information P for CSSCI-1. In this manner, CSSCI-0, Timeline-0; CSSCI-0, Timeline-1; and CSSCI-1, Timeline-2 are associated together as pairs having spanned watermarked information. This permits the same CSSCI type payload to be used for multiple different time location payloads.

As illustrated, each temporal location payload is associated with a previously received CSSCI type payload, and thus unidirectional in its association. In the event that a previous CSSCI type payload matching a temporal location payload is not available, then the system may be able to determine that a packet has been lost or otherwise the watermarking was not effective. The loss of watermarking data occurs with some frequency because the audio-video content tends to be modified by audio-video transcoding, such as to reduce the bitrate of the audio-video content.

Figure 8:
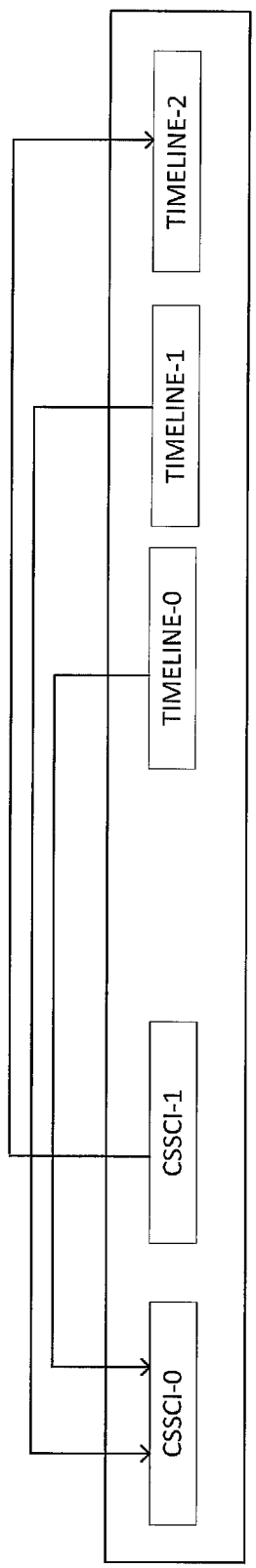
FIG. 8 illustrates relationships between watermark payloads.

Referring to FIG. 8, an exemplary time line is illustrated. A first CSSCI type payload (e.g., CSSCI-0) has a first set of association information P while a second CSSCI type payload (e.g., CSSCI-1) has a second different set of association information P. Having two different association information P for CSSCI-0 and CSSCI-1 distinguish between and identify the two CSSCI payloads. A first time location payload (e.g., Timeline-0) has the first set of association information P that matches the association information P for CSSCI-0, a second time location payload (e.g., Timeline-1) has the same first set of association information P that matches the association information P for CSSCI-0, a third time location payload (e.g., Timeline-2) has the same second set of association information P that matches the association information P for CSSCI-1. In this manner, CSSCI-0, Timeline-0; CSSCI-0, Timeline-1; and CSSCI-1, Timeline-2 are associated together as pairs having spanned watermarked information. This permits the same CSSCI type payload to be used for multiple different time location payloads. As illustrated, two of the temporal location payloads are associated with a previously received CSSCI type payload, and one of the CSSCI type payloads are associated with a subsequently received Temporal location payload, and thus bidirectional in its association. In the event that a corresponding CSSCI type payload matching a temporal location payload is not available, then the system may be able to determine that a packet has been lost or otherwise the watermarking was not effective. Similarly, in the event that a corresponding timeline type payload matching a CSSCI payload is not available, then the system may be able to determine that a packet has been lost or otherwise the watermarking was not effective. The loss of watermarking data occurs with some frequency because the audio-video content tends to be modified by audio-video transcoding, such as to reduce the bitrate of the audio-video content.

In an example, a CSSCI type payload (e.g. CSSCI-0) has two sets of association information P0 and P1. A time location payload, e.g. Timeline-0, has two sets of association information P0 and P1 that matches the association information P0 and P1 for CSSCI-0. In this example a bidirectional association exists for the pair CSSCI-0, Timeline-0 where P0 points to CSSCI-0 and P1 points to Timeline-0.

The number of bits assigned to the payload identifier (P) may be modified, as desired (e.g., for a desired robustness). Similarly, the number of bits assigned to I, A, T, D, L, and R may be modified, as desired.

Figure 9:
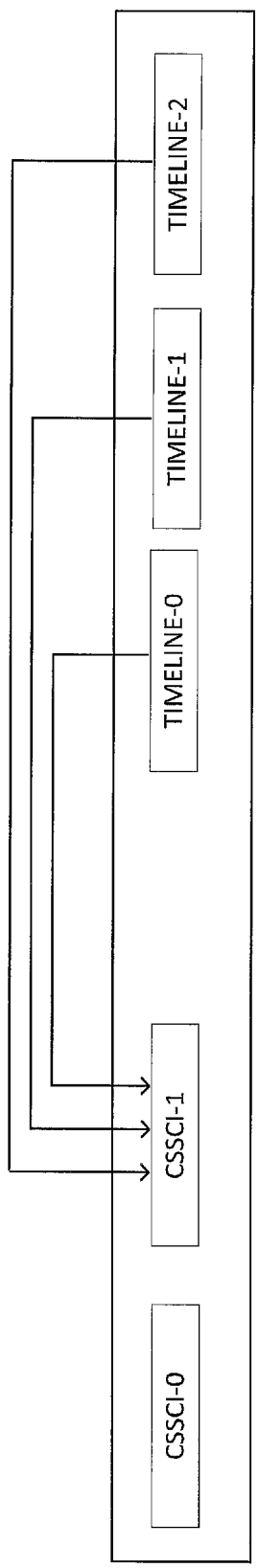
FIG. 9 illustrates relationships between watermark payloads.

In an example embodiment, the AV presentation device 180 may maintain a list denoted by a variable listC of "c" most recently received CSSCI payload(s). "c" may be provided in the watermark, if desired, or otherwise set by the system. In this manner, the AV presentation device 180 may only have to maintain a limited number of CSSCI payloads in memory. In the case that c=1, then once a CSSCI payload is received it remains in effect until another CSSCI payload is received, as illustrated in FIG. 9. A loss of a CSSCI payload may be detected using the payload identifier (P), for example, the temporal location payload contains a P that does not correspond to any of the CSSCI payloads in listC. In this manner, the same user experience may be achieved across different AV presentation devices 180.

In an example embodiment, the AV presentation device 180 may maintain more than one list of received CSSCI payload(s). Each list may differ in size and may be maintained (i.e. addition/removal of entries within the list) using a differing set of rules. It is to be understood, that this does not preclude the possibility that a subset of lists may have same size and/or same maintenance rules. As an example, there may be two lists maintained by 180 where one list contains "c1" most recently received CSSCI payload(s) where each payload is received at an interval of "0" CSSCI payload(s); while the other list contains "c2" most recently received CSSCI payload(s), where each payload is received at an interval of "d" CSSCI payload(s).

Figure 10:
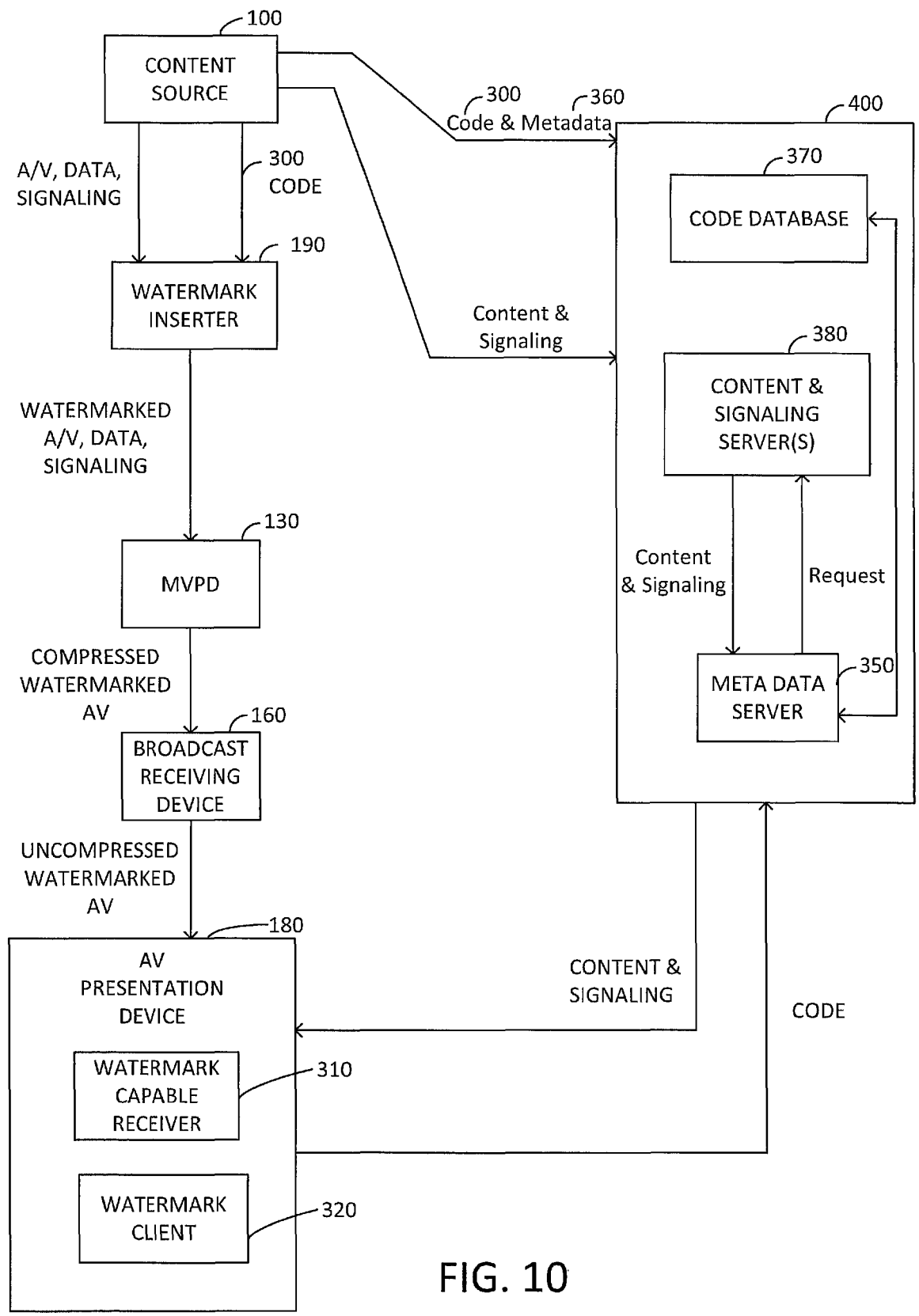
FIG. 10 illustrates another system with enhanced information.

Referring to FIG. 10, a modified system may include the content source 100, the watermark inserter 190, the MVPD 130, the broadcast receiving device 160, and the AV presentation device 180 together with its watermark capable receiver 310 and watermark client 320. The content server 400 may be modified to include the code database 370, the metadata server 350, and the content and signaling server(s) 380. The code 300 and metadata 360 is provided to the content server 400 by the content source 100. The content and signaling data is provided to the content and signaling server(s) 390.

The AV presentation device 180 may provide a code in a request based upon the decoded one or more watermarks from the audio-video broadcast. The content server 400 receives the request with the code from the AV presentation device 180. The metadata server 380 then parses the received code request and based upon information from the code database 370, makes a request to the content and signaling server(s) 390 to determine the content and signaling information which is then provided to the AV presentation device 180. In this manner, the AV presentation device 180 only needs to make a single request to a single content server 400, which in turn provides the response to the AV presentation device 180. It is to be understood that the different functions of the content server 400 may be achieved by combining the existing functions together, separating the existing functions into more components, omitting components, and/or any other technique.

A http/https request URL (that will be sent to the content server 400) corresponding to payload(s) in FIG. 5 and FIG. 6, when time sensitive trigger D equals to 1, may be defined as:

If A is equal to 0 then the http request URL is:
http://IIIIIIII.IIIIIIII.IIIIIIII.IIIIIIII/
LLLLLLLLL?time=TTTTTTTTTTTTTTTTTT TTTTTT
Otherwise, the https request URL is:
https://IIIIIIII.IIIIIIII.IIIIIIII.IIIIIIII/
LLLLLLLLL?time=TTTTTTTTTTTTTTTTTT TTTTTTT
where IIIIIIII.IIIIIIII.IIIIIIII.IIIIIIII above corresponds to the 32-bit IP address signaled in CSSCI payload.

In an example embodiment, the subset of URL that specifies information such as: the content server location, the communication protocol, communication port, the login information, the folder on the content server are carried in a designated payload type.

In some implementations a value of a syntax element may be derived using a decoding process which may access information spanning multiple payloads. For example, the time code may be fragmented into multiple watermark payloads and then reassembled to construct a complete time code. In an example, the time code may correspond to a temporal location within the audio-visual content. In an example, the time code may correspond to timeline data of the audio-visual content.

For example, the payload size may be 50 bits while the desirable metadata may be 66 bits, thus exceeding the payload size of a single watermark. An example of the desirable metadata may be as follows:

| | |
|---|---|
| Location of content and server (I) | 32 bits (IP address) |
| Application layer protocol (A) | 1 bit (http/https) |
| Time code (T) | 25 bits (for 1 year of uniqueness with a granularity of 1 second) |
| Time sensitive trigger (D) | 1 bit |
| Channel identification (L) | 5 bits |
| Duration for content server requests (R) | 2 bits |

Another example of the desirable metadata may be as follows:

| | |
|---|---|
| Location of content and server (I) | 32 bits (IP address) |
| Application layer protocol (A) | 2 bit (00 = http/01 = https, 10 = reserved, 11 = reserved) |
| Time code (T) | 25 bits (for 1 year of uniqueness with a granularity of 1 second) |
| Time sensitive trigger (D) | 1 bit |
| Channel identification (L) | 5 bits |
| Duration for content server requests (R) | 2 bits |

Figure 11:
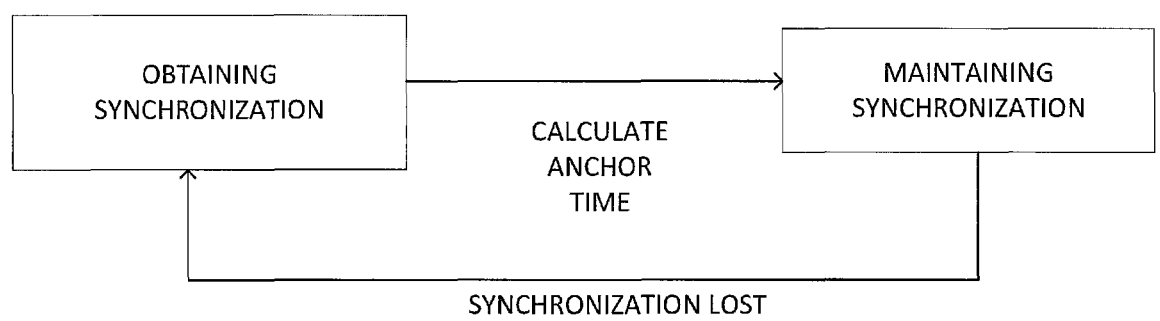
FIG. 11 illustrates obtaining synchronization and maintaining synchronization.

Referring to FIG. 11, a state transition diagram illustrates one technique to calculate the time code. To obtain a time code synchronization a number of consecutive payloads starting with a payload type "start sync", is followed by payloads of type "not start sync", with a total being equal to "r". By using the total of "r" consecutive payloads, each having some time information contained therein, the time synchronization may be determined by calculating an anchor time. After calculating the anchor time code, the time code may be updated by receiving additional payloads that include partial time code information therein in such a manner that does not require receiving another total of "r" consecutive payloads to determine the next time code. One technique to achieve this time synchronization is to partition the time code in consecutive payloads and an incremental time code in each of the consecutive payloads. When the synchronization is lost, such as by changing the channel, the obtain synchronization process is performed. A video display device when first turned ON enters the initial "obtaining synchronization" state.

Referring to FIG. 12, an exemplary structure of a watermark payload is illustrated. Z indicates the payload type, where Z equal to 1 indicates the start of the time sync and Z equal to 0 indicates not start of time sync. S indicates the time sync payload bits used in determining absolute time code. M indicates the time sync payloads bits used in maintaining the time code.

By way of example, the AV presentation device 180 may receive n=7 consecutive watermark payloads where the first payload has Z=1 while the subsequent watermark payloads have Z=0. The bits corresponding to "SSSS" are extracted from $(t-n+1)^{th}$ to $t^{th}$ watermark payload and concatenated together to obtain a 28 bit representation of the time code "$T_t$" of a temporal location. The anchor time code "$C_t$" is also set to "$T_t$". "$T_t$" may be represented as $SSSS_{z=1,t-n+1} \ldots SSSS_{z=0,t-1}SSSS_{z=0,t-1}$; "$C_t$"="$T_t$". In another embodiment, constants may be added (to select a future time) and/or multiplied (to change the granularity) to the derived values. In yet another alternative embodiment, the derived values are mapped to another value by use of a mapping function.

Once the initialization synchronization is obtained, the anchor time and payload time are updated using each payload. This may be performed, for example, as follows:

$$T_t = f(C_{t-1}, MMMM_t)$$

$$C_t = g(T_t)$$

Where, f represents a mapping function that takes as input 2 values and outputs 1 value; g represents a mapping function that takes as input 1 value and outputs 1 value; / represents integer division with truncation of the result toward zero, For example, 7/4 and −7/−4 are truncated to 1 and −7/4 and 7/−4 are truncated to −1. In an example embodiment:

$$T_t = C_{t-1} + MMMM_t$$

$$C_t = T_t$$

As described above, every "n" payloads the anchor time may also be determined using the bits corresponding to "SSSS". The anchor time determined using "SSSS" must match the anchor time derivation above and can be used to verify the correctness of the maintained time code.

Since the watermark may span a non-zero time, the temporal location of the time code $T_t$ may be determined by a set of rules, such as for example, $T_t$ may correspond to a time instant at the end of the t-th watermark payload.

It is to be understood that multiple syntax elements may be combined to form the code. The code may then be mapped either by the AV presentation device 180 or using another server to different syntax element values. For example, the server information (e.g., location of the content and signaling server(s) and/or application layer protocol, etc.) and time code is combined into a single code. The single code is then mapped to a temporal location in the uncompressed audio-video stream, and location of the content and signaling server(s). In this manner, a single request may be made to the server for additional information.

A limited number of bits may be used for the time code, in such a manner to permits collisions in the time code. For example, using 20 bits for the timecode allows for at most 12 days of uniqueness at a granularity of 1 second. After 12 days the codespace corresponding to the timecode will be reused tending to result in collisions.

In one embodiment the watermark payload may be encapsulated within a Standards Developing Organization (SDO) Private data command as SDO Payload using cmdID's. As an example the watermark payload of FIG. 5 or FIG. 6 maybe encapsulated as SDO payload. A cmdID value 0x05 may refer to a watermark based interactive services trigger (triggered declarative object—TDO Model). A cmdID value 0x06 may refer to a watermark based interactive services trigger (direct execution model). This facilitates the re-use of existing segmentation and reassembly modules built for trigger transportation. The segmented command may be embedded in watermarks, if desired. The SDO Private data may be desired, such as illustrated in FIG. 13, where the packet is included as part of SDO_payload( ). In some embodiments the watermark payload received in this manner maybe passed to an entity/module in the receiver which handles these defined cmdID types. Then segmentation and reassembly functionality of that module could be reused if watermark payload packet needs to be split into multiple packets—depending upon the selected watermark scheme's capacity in terms of number of bits.

Parameter type T is a 2-bit field that indicates whether the instance of the SDOPrivatedata command is part of a segmented variable length command, as defined in Section 7.1.11.2 of CEA-708 ("CEA: "Digital Television (DTV) Closed Captioning, CEA-708-E, Consumer Electronics Association, June 2013"), and if so, whether the instance is the first, middle, or last segment. The Type field in the SDOPrivateData command is encoded as specified in Section 7.1.11.2 of CEA-708. pr is a flag that indicates, when set to '1', that the content of the command is asserted to be Program Related. When the flag is set to '0', the content of the command is not so asserted. Length (L) is an unsigned integer that indicates the number of bytes following the header, in the range 2 to 27, and is represented in the SDOPrivateData command as the set of bits $L_4$ through $L_0$ where $L_4$ is the most significant and $L_0$ is the least significant. cid (cmdID) is an 8-bit field that identifies the SDO that has defined the syntax and semantics of the SDO_payload( ) data structure to follow. The metadata may be encapsulated within SDO Private data as SDO Payload using cmdID's as shown in FIG. 14.

The payload defined in FIG. 5 and FIG. 6 may be encapsulated within a Standards Developing Organization (SDO) Private data (SDOPrivateData) command as SDO Payload using cmdID's. A cmdID value 0x05 and 0x06 may refer to encapsulation of payloads defined in FIG. 5 and FIG. 6 respectively. This facilitates the re-use of existing segmentation and reassembly modules built for trigger transportation. The segmented command may be embedded in watermarks, if desired. The SDO Private data may be desired, such as illustrated in FIG. 13, where the payload packet is included as part of SDO_payload( ).

The payload defined in FIG. 12 may be encapsulated within a Standards Developing Organization (SDO) Private data command as SDO Payload using cmdID's. A cmdID value 0x05 may refer to encapsulation of payload defined in FIG. 12. This facilitates the re-use of existing segmentation and reassembly modules built for trigger transportation. The segmented command may be embedded in watermarks, if desired. The SDO Private data may be desired, such as illustrated in FIG. 13, where the packet is included as part of SDO_payload( ).

Figure 15:
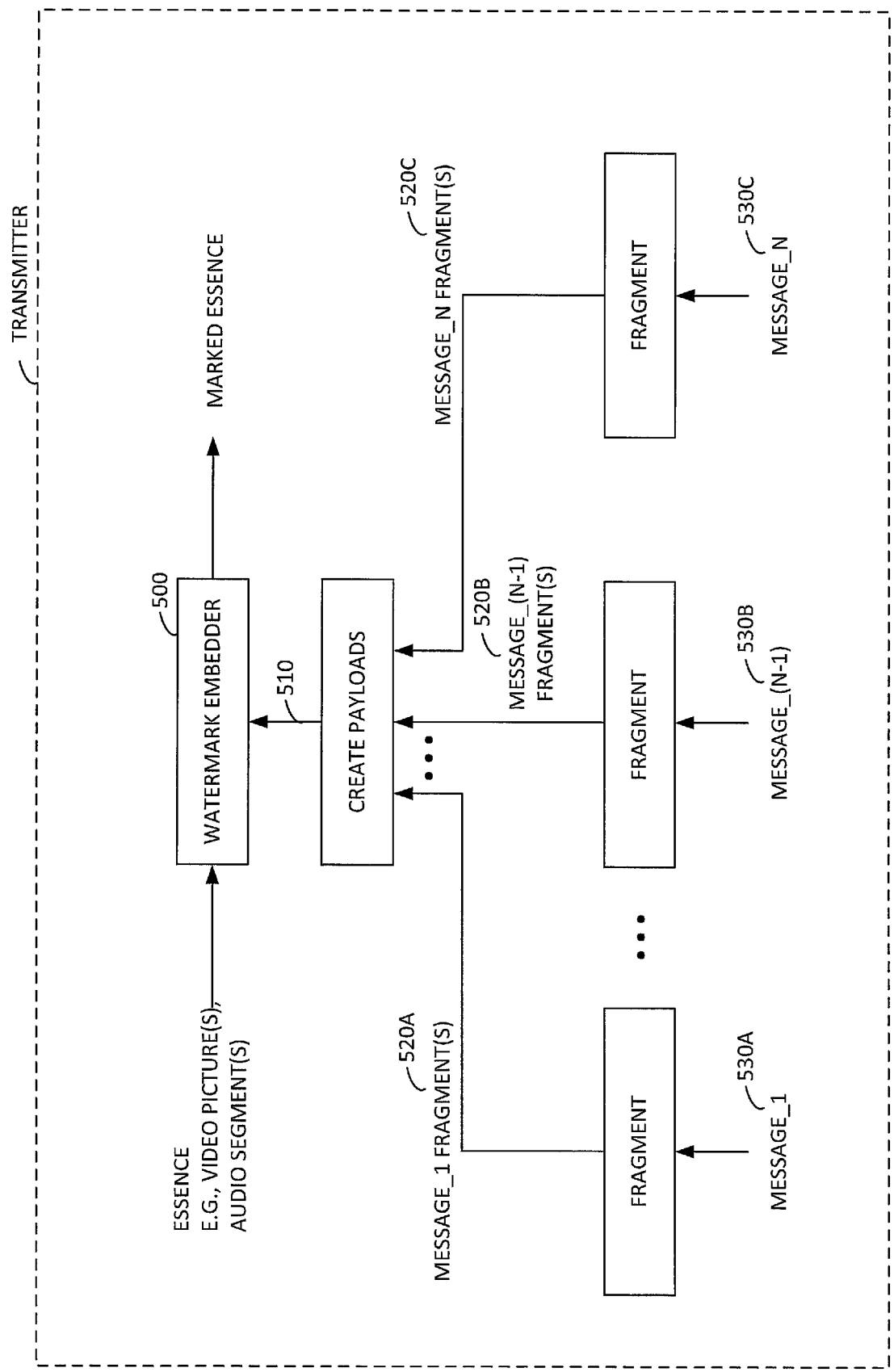
FIG. 15 illustrates a watermark embedding system.

Referring to FIG. 15, a transmitter of the system may receive one or more messages 530A, 530B, 530C that are to be embedded as a watermark into an essence (e.g., audio and/or video content). The one or more messages 530A, 530B, 530C may be packaged in the form of one or more fragments 520A, 520B, 520C. By way of example, each message may be packed in the form of a corresponding fragment. By way of example, each message may be packed in the form of one or more corresponding fragments. By way of example, a message may be partitioned each of which corresponds to a message fragment. In some cases, a message that exceeds the permitted length of a fragment may be spread into a plurality of corresponding fragments. In some cases, a long message may be spread over a plurality of corresponding fragments. In an example, each of the fragments is encoded to be transmitted only when there are no other fragments need to be transmitted. The transmitter may receive the message fragment(s) and create a series of one or more payloads 510 to be embedded within the essence. In some cases, the series may include embedding and/or sending the same message fragment(s) multiple times. In a typical embodiment, one payload is embedded with one unit of the essence (e.g., one picture of the video and/or one segment of the audio). Each of the payloads 510 may include additional header and signaling information for the fragment(s). The essence, which may be for example a video picture and/or an audio segment, may be received by a watermark embedder 500 which embeds the payload 510 therein, to create a marked essence.

In an example system, it may be required that if a picture within a video segment carries a watermark then all the pictures within the video segment would carry a watermark. A receiver may then detect the loss of pictures by detecting that no watermark segment is being detected in the current video segment, whereas on a earlier occasion a picture within the video segment contained a watermark. A video segment would correspond to a group of consecutive pictures. Within a receiver a video segment may be identified by the watermark extractor by some external means.

Figure 16:
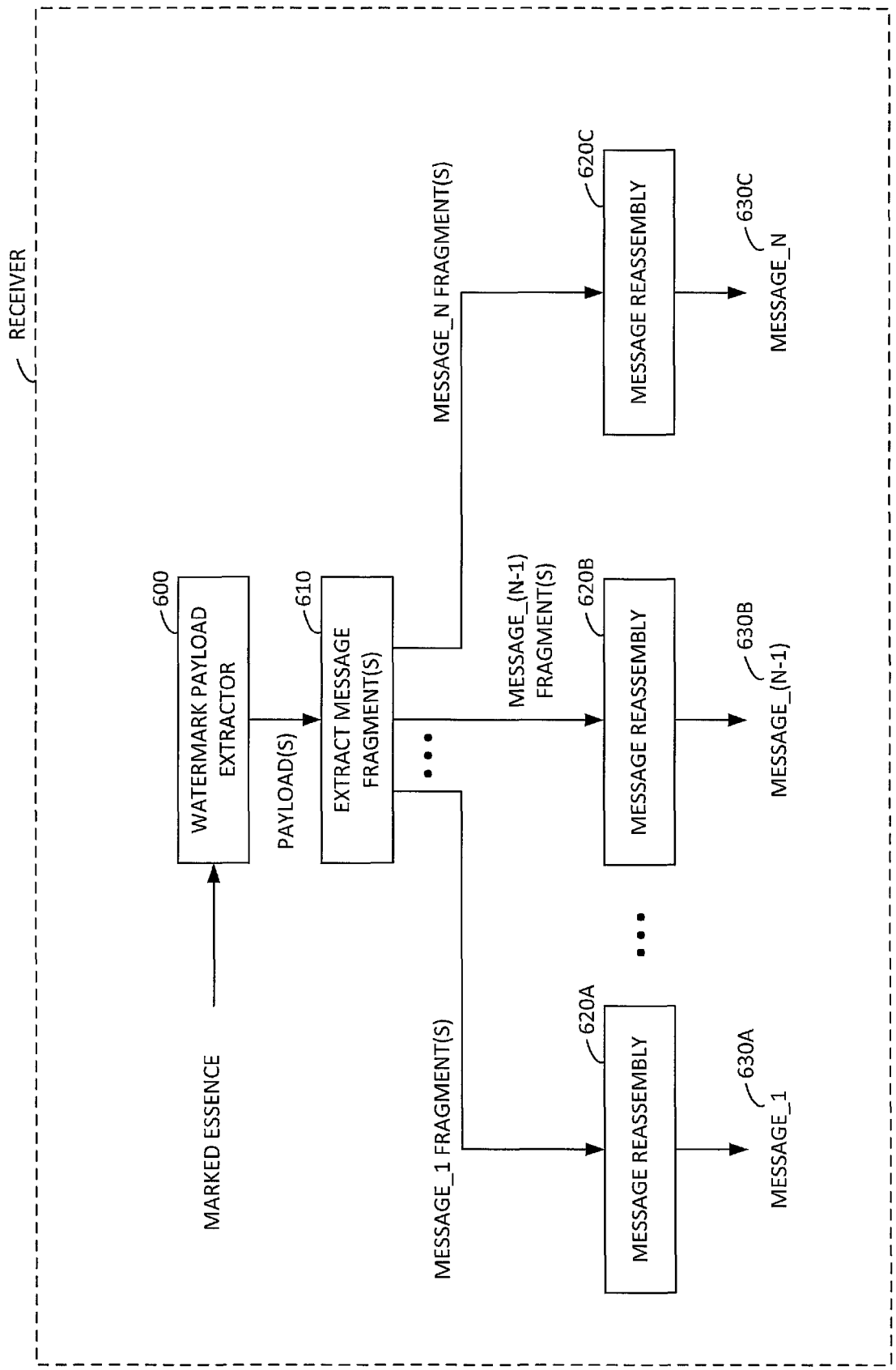
FIG. 16 illustrates a watermark extracting system.

Referring to FIG. 16, a decoder or receiver of the system may receive one or more marked essences, such as those provided by the transmitter of FIG. 15. A watermark payload extractor 600 extracts the payload(s) from the marked essence(s). One or more message fragments may be extracted 610 from the one or more payloads. The result of the extraction 610 is a series of one or more message fragments. Each of the one or more message fragments may be grouped appropriately (for e.g. using header information of the message fragment) and input to a message reassembly 620A, 620B, 620C. The result of the message reassembly 620A, 620B, 620C is a series of messages 630A, 630B, 630C. Each of the messages 630A, 630B, 630C may be the result of the reassembly of one or more fragments, which may be the result of one or more payloads, which may be the result of one or more marked essences. In an embodiment the extracted and reassembled Message 1 (630A), . . . , Message (N−1) (630B), Message N (630C) in FIG. 16 will be respectively identical to the Message 1 (530A), . . . , Message (N−1) (530B), Message N (530C) in FIG. 15. By way of example, message reassembly may involve concatenating, in a particular order, the message data included in a group of message fragments.

The message fragment may include type information that indicates the particular type of information carried in the fragment. For example, the message type may indicate that the information includes a subset of a pre-defined set of syntax elements (e.g. content identifier, media time). In some cases, the values taken on by some syntax elements may be used to determine the exact subset of syntax elements included in the message fragment. For example, the message type may indicate that the information may include a channel identifier. For example, the message type may indicate that the information may include a uniform resource identifier (URI), and a URI type. In another example, the message type may indicate that the information include a content identifier.

In an example, a message fragment may include a content identifier which may correspond to an Entertainment Identifier Registry (EIDR).

In an example, a message fragment may include a content identifier which may correspond to an Ad-ID used to track advertising assets.

In an example, the message fragment may include length information about variable length information included within it.

In an example, the watermark payload may include a message.

In an example, the message can be included within one message fragment.

In an example, a watermark payload may carry one or more message fragments.

In an example, a message fragment may include length information about the variable length information included within it, for e.g. URI, Ad-ID.

In an example, the message fragment may include length information about a first variable length information included within the message fragment. The first variable length information may include a fixed length part and a second variable length information. The length of the second variable length information may be derived as the length of first variable length information minus the length of fixed length part. The length of the fixed length part may be derived in any suitable manner. For example, the fixed length part may be derived based upon the message type, the length of the first variable length information, the length of syntax elements belonging to a fixed length part included within the message fragment. In an example the length of part of the second variable length information included in a message fragment is derived as the length of the first variable length information minus the length of the fixed length part included in the message fragment. In an example the fixed length part included in a message fragment may not be included contiguously. In an example the fixed length part included in a message fragment may lie on either side of the second variable length information. In an example the fixed length part is only included partially within the message fragment. In an example the fixed length part may not be included within the message fragment.

Figure 17:
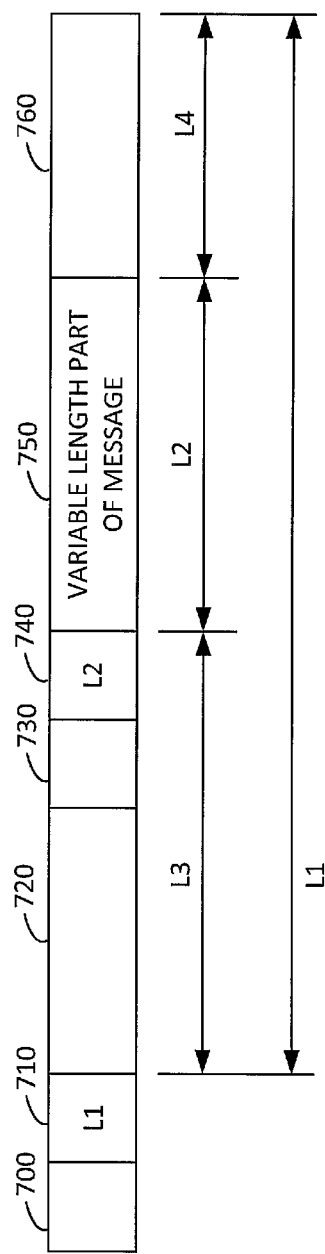
FIG. 17 illustrates a message fragment.

Referring to FIG. 17, an exemplary message fragment structure is illustrated. Identification data 700 may be signaled prior to the signaling of syntax element corresponding to length L1 710, such as a message identification indicating the type of message. By way of example, the identification data 700, signaled prior to the signaling of syntax element corresponding to length L1 710, may be 1 byte (e.g., 8 bits). The syntax element corresponding to length L1 710 is signaled in the message fragment, such as by using 1 byte, which indicates the length of the overall message fragment following the signaling of syntax element corresponding to length L1. The identification data 700 may indicate a particular type of structure for the overall message to be included within the length signaled by syntax element corresponding to length L1 710. By way of example, additional signaling data 720 may be included, such as data indicating the relationship of one particular message fragment to one or more other message fragments. By way of example, this additional signaling data 720 may be 1 byte. The particular type of information to be included within the message fragment may further be signaled based upon the identification data 700. By way of example, particular type of information 730 may be signaled using 1 byte to indicate a type of URI string to be signaled as a message. By way of example, particular type of information 730 may be signaled using fixed number of bits to indicate a type of content identifier (e.g. Ad-ID, EIDR) to be signaled as a message. The syntax element corresponding to length L2 740 is signaled in the message fragment, such as by using 1 byte, which indicates the overall length of the subsequent variable length part of the message 750. The variable length part of the message 750 may be any suitable information, such as a URI, an Ad-ID. A checksum 760, such as a Cyclic Redundancy Check (CRC), may be included corresponding to the message fragment indicated as L4. The checksum 760 may be, for example, 4 bytes. The checksum may correspond to a checksum of all or subset of the message fragment.

As it may be observed, the length L1 is signaled and the length L2 is signaled, with the length L3 and the length L4 being known based upon syntax elements included in the message fragment, the values of the syntax elements of the message fragment/message, such as that identified by the identification data 700. It was determined that the identification data 700 indicating the structure of the watermark payload the length of L3 and L4 are known. With L3 and L4 being known together with L1 being expressly signaled, L2 may be derived (e.g., L2=L1−L3−L4). With L2 being derived, it is desirable to omit signaling syntax element corresponding to length L2 which permits additional data to be included with the message, if desired.

In an example a receiver may decode 750 using length L2 and then skip over part of the information contained in 760 if the received length L4 is greater than a pre-determined value (e.g. 4 bytes). Such a receiver implementation allows the syntax to be extended by appending information after the variable length part of the message with signaled length L2 without breaking existing receivers.

Figure 18:
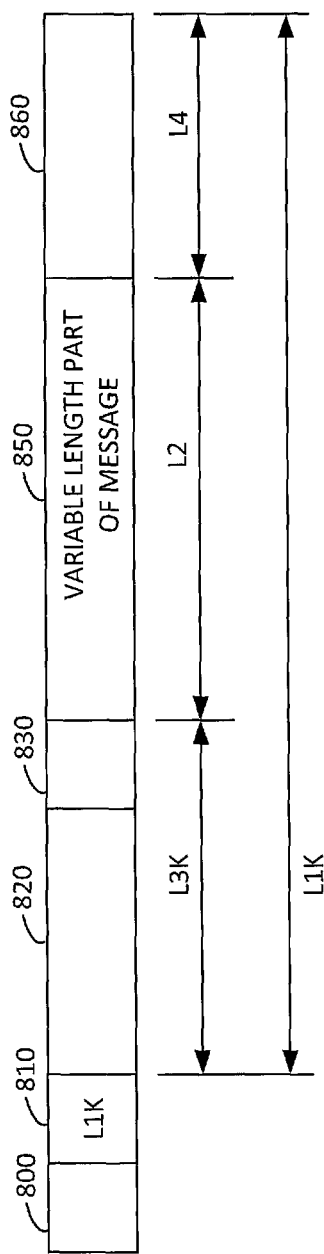
FIG. 18 illustrates another message fragment.

Referring to FIG. 18, an exemplary modified message fragment structure is illustrated. Identification data 800 may be signaled prior to the signaling of syntax element corresponding to length L1K 810, such as a message identification indicating the type of message. By way of example, the identification data 800, signaled prior to the signaling of syntax element corresponding to length L1K 810, may be 1 byte (e.g., 8 bits). The syntax element corresponding to length L1K 810 is signaled in the message fragment, such as by using 1 byte, which indicates the length of the overall message fragment following the signaling of syntax element corresponding to length L1K. The identification data 800 may indicate a particular type of structure for the overall message to be included within the length signaled by syntax element corresponding to length L1K 810. By way of example, additional signaling data 820 may be included, such as data indicating the relationship of one particular message fragment to one or more other message fragments. By way of example, this additional signaling data 820 may be 1 byte. The particular type of information to be included within the message fragment may further be signaled based upon the identification data 800. By way of example, particular type of information 830 may be signaled using 1 byte to indicate a type of URI string to be signaled as a message. By way of example, particular type of information 830 may be signaled using fixed number of bits to indicate a type of content identifier (e.g. Ad-ID, EIDR) to be signaled as a message. The syntax element corresponding to length L2 is not signaled in the message fragment, unlike the structure illustrated in FIG. 17, which relates to the overall length of the subsequent variable length part of the message 850. L2 may be derived, such as by L2=L1K−L3K−L4. L3K is known based upon syntax elements included in the message fragment, the values of the syntax elements of the message fragment/message, such as the identification data 800. The variable length part of the message 850 may be any suitable information, such as a URI, an Ad-ID. A checksum 860, such as a CRC, may be included corresponding to the message fragment indicated as L4. The checksum 860 may be, for example, 4 bytes. The checksum may correspond to a checksum of all or subset of the message fragment. In an example 860 may include other fixed length elements of the message. L4 is known based upon syntax elements included in the message fragment, the values of the syntax elements of the message fragment/message, such as the identification data 800. It is to be understood that the identification data 800 may correspond to particular lengths of the data or otherwise the particular lengths of the data may be predetermined based upon an agreed to structure.

Figure 19:
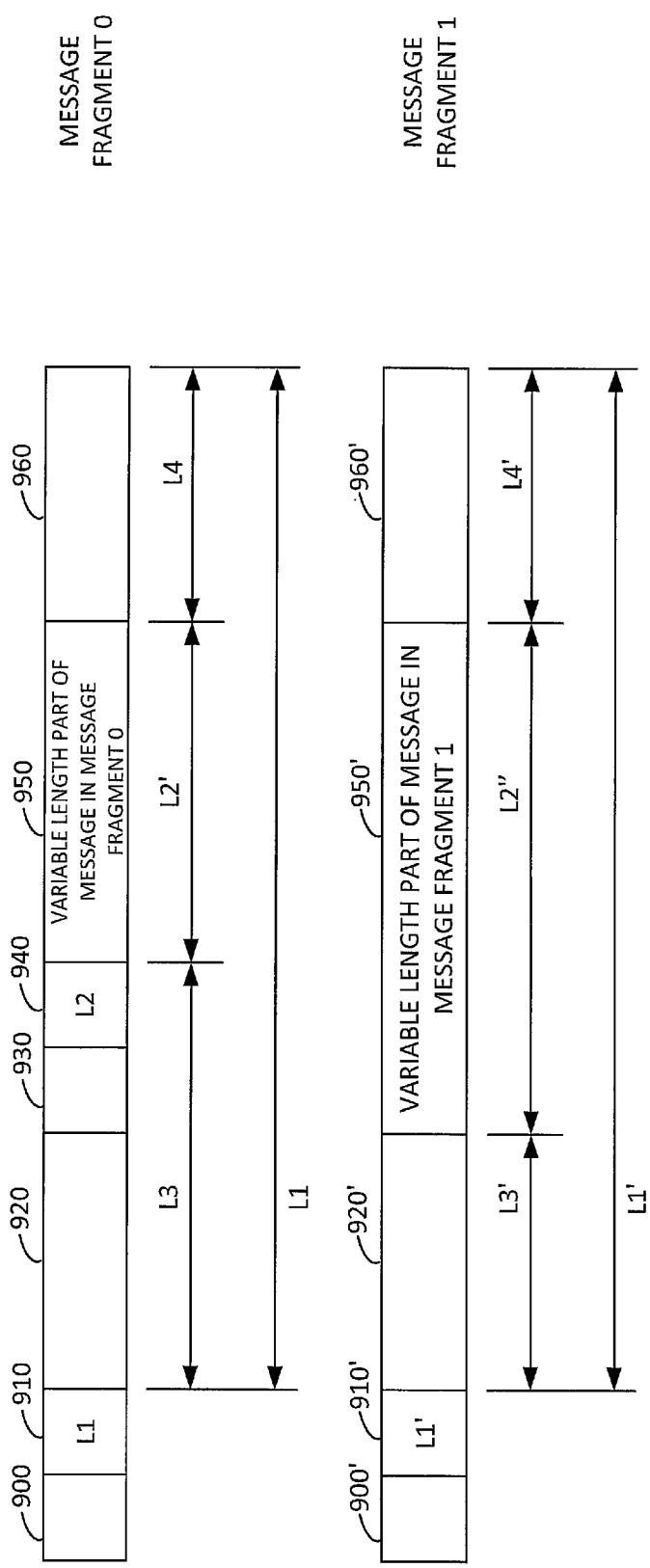
FIG. 19 illustrates multiple message fragments.

Referring to FIG. 19, an exemplary message structure is illustrated where the message is partitioned across two message fragments MESSAGE FRAGMENT 0 and MESSAGE FRAGMENT 1. Identification data 900 may be signaled prior to the signaling of syntax element corresponding to length L1 910, such as a message identification indicating the type of message. By way of example, the identification data 900, signaled prior to the signaling of syntax element corresponding to length L1 910, may be 1 byte (e.g., 8 bits). The syntax element corresponding to length L1 910 is signaled in the message fragment, such as by using 1 byte, which indicates the length of the overall message fragment following the signaling of syntax element corresponding to length L1. The identification data 900 may indicate a particular type of structure for the overall message part of which is to be included within the length signaled by syntax element corresponding to length L1 910. By way of example, additional signaling data 920 may be included, such as data indicating the relationship of one particular message fragment to one or more other message fragments. By way of example, this additional signaling data 920 may be 1 byte. In an example, this relationship data may indicate a pair of message fragments spanning across two watermark payloads. In an example, this relationship data may indicate a pair of message fragments included in the same watermark payload. The particular type of information to be included within the message fragment may further be signaled based upon the identification data 900. By way of example, particular type of information 930 may be signaled using 1 byte to indicate a type of URI string to be signaled as a message. By way of example, particular type of information 930 may be signaled using fixed number of bits to indicate a type of content identifier (e.g. Ad-Id, EIDR) to be signaled as a message. The syntax element corresponding to length L2 940 is signaled in the watermark, such as by using 1 byte, which indicates the overall length of the subsequent variable-length part of the message which spans multiple message fragments. 950 may be part of any suitable variable length message, such as a URI, an Ad-ID. A checksum 960, such as a CRC, may be included corresponding to the message fragment indicated as L4. The checksum 960 may be, for example, 4 bytes. The checksum may correspond to a checksum of all or subset of the message fragment. In an example 960 may include other fixed length elements of the message. A similar second message fragment may be included, with another part of the variable length part of the message. It is noted that the second message fragment may omit the syntax element corresponding to length L2 940 and the particular type of information 930, since the second message fragment corresponds to the same type as the first message fragment.

As it may be observed, the length L1 and L1' are signaled and the length L2 is signaled, with the length L3, the length L3', the length L4, and the length L4' being known based upon the length of fixed length syntax elements included in the message fragment, the values of the syntax elements of the message fragment/message, such as that identified by the identification data 900 and 900'. It was determined that considering some syntax elements values, the syntax elements included within the message fragment and with the identification data 900 and 900' indicating the structure of the message, it indicates the length of L3 and L3' and L4 and L4'. With L3 and L3' and L4 and L4' being known together with L1 and L1' being expressly signaled, L2' and L2'' may be derived (e.g., L2', L1-L3-L4 and L2''=L1'-L3'-L4'). With L2' and L2'' being derived, it is desirable to omit signaling L2 and/or L2' and/or L2'' which permits additional data to be included with the message fragment(s), if desired.

In an example a receiver may decode 950 and 950' using length L2 and then skip over part of the information contained in 960' if the received length L4' is greater than a pre-determined value (e.g. 4 bytes). Such a receiver implementation allows the syntax to be extended by appending information after the variable length part of the message with signaled length L2 without breaking existing receivers.

Figure 20:
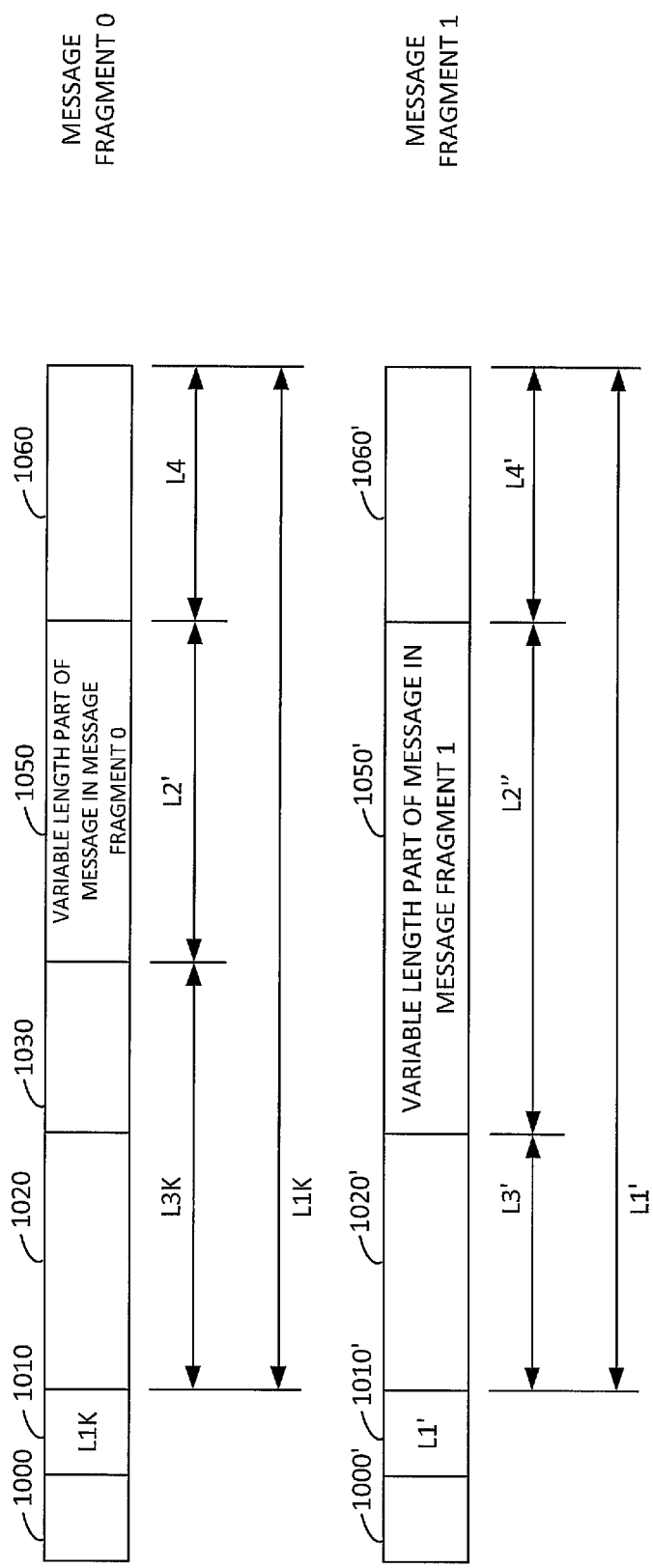
FIG. 20 illustrates another multiple message fragments.

Referring to FIG. 20, an exemplary modified message structure is illustrated where the message is partitioned into two message fragments MESSAGE FRAGMENT 0 and MESSAGE FRAGMENT 1. Identification data 1000 may be signaled prior to the signaling of syntax element corresponding to length L1K 1010, such as a message identification indicating the type of message. By way of example, the identification data 1000, signaled prior to the signaling of syntax element corresponding to length L1K 1010, may be 1 byte (e.g., 8 bits). The syntax element corresponding to length L1K 1010 is signaled in the watermark, such as by using 1 byte, which indicates the length of the overall message fragment following the signaling of syntax element corresponding to length L1K. The identification data 1000 may indicate a particular type of structure for the overall message part of which is to be included within the length signaled by syntax element corresponding to length L1K 1010. By way of example, additional signaling data 1020 may be included, such as data indicating the relationship of one particular message fragment to one or more other message fragments. By way of example, this additional signaling data 1020 may be 1 byte. In an example, this relationship data may indicate a pair of message fragments spanning across two watermark payloads. In an example, this relationship data may indicate a pair of message fragments included in the same watermark payload. The particular type of message to be included within the message fragment may further be signaled based upon the identification data 1000. By way of example, particular type of information 1030 may be signaled using 1 byte to indicate a type of URI string to be signaled as a message. By way of example, particular type of information 1030 may be signaled using fixed number of bits to indicate a type of content identifier to be signaled as a message. The syntax element corresponding to length L2 is not signaled in the watermark, unlike the structure illustrated in FIG. 19, which relates to the overall length of the subsequent message 950. L2' may be derived, such as by L2'=L1K-L3K-L4. L2'' may be derived, such as by L2''=L1'-L3'-L4'. L3K and L3' are known based upon syntax elements included in the message fragment, the values of the syntax elements of the message fragment/message, such as the identification data 1000. The variable length part of message in message fragment 0, 1050 may correspond to a part of any suitable message, such as the URI, an Ad-ID, and may correspond to the first fragment of a multiple fragment message. A checksum 1060, such as a CRC, may be included corresponding to the message fragment indicated as L4. The checksum 1060 may be, for example, 4 bytes. The checksum may correspond to a checksum of all or subset of the message fragment. In an example 1060 may include other fixed length elements of the message. A similar second message fragment may be included, with another part of the variable length part of the message. It is noted that the second message fragment may likewise omit the particular type of message 930, since the second message fragment corresponds to the same type as the first message fragment. It is to be understood that the signaling of the lengths in FIG. 20, such as L1' of FIG. 20, is not necessarily the same as the signaling of the lengths in FIG. 19, such as L1' of FIG. 19. This likewise applies to the other signaled lengths and message structures illustrated in the various figures.

Figure 21:
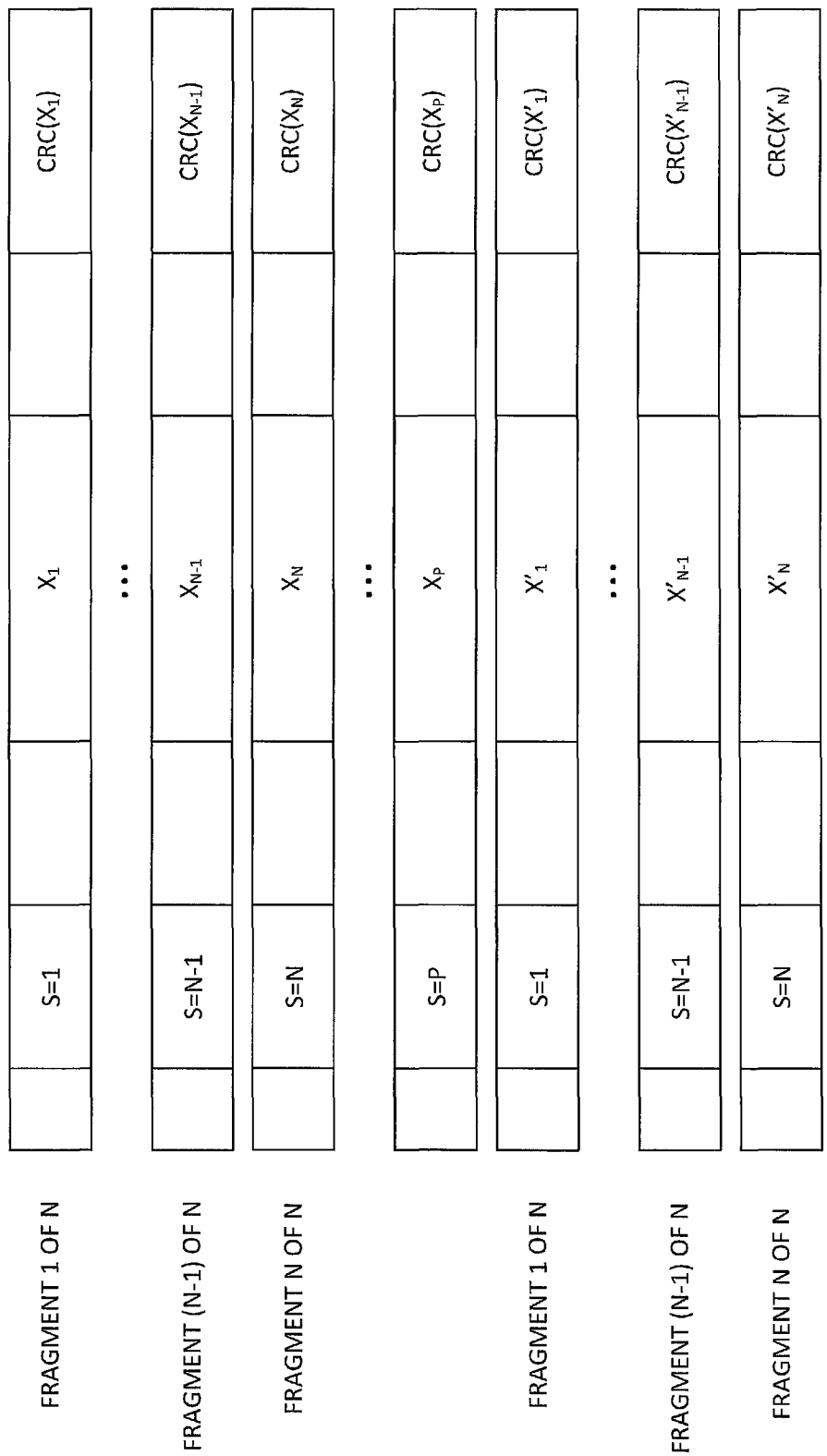
FIG. 21 illustrates another multiple message fragments.

Referring to FIG. 21, the general structure of a message fragment for a set of message fragments N of a message is illustrated, with a first fragment S=1, . . . , a N-1th fragment S=N-1, and a Nth fragment S=N. A corresponding part of the message is included with each message fragment, namely, a part $X_1$, . . . , a part $X_{N-1}$, and a part $X_N$. In an example the parts $X_1$, . . . , $X_{N-1}$, $X_N$ may include additional data other than that corresponding to the message. A corresponding CRC is included with each fragment, namely, $CRC(X_1), \ldots, CRC(X_{N-1}), CRC(X_N)$. In this manner each CRC corresponds with the part of the message of the particular fragment. If the CRC matches for each of the fragments, namely fragments 1 through N, then each of the fragments is properly received. Additional fragments and non-fragmented messages may be received through the maximum available fragment number, namely, segment P. After segment P, the fragments may repeat with the number 1 through N for the next segment. Likewise, the fragments may extent over P to 1 while being sequential in nature. For example, the CRC may be a CRC_32 value i.e. the value of syntax element CRC_32.

While the CRC associated with each message fragment or otherwise each non-fragmented message ensures that each message is properly received, if a sequential series of segments are not received then the system may not be able to detect such a loss. For example, if all the message fragments corresponding to $X_T$ through $X'_{T-1}$, are lost, then when the system receives the next watermarked message $X'_T$ it would not be able to detect the absence of a series of segments. For example in FIG. 21 loss of fragments corresponding to S=N carrying $X_N$, through S=N−1 carrying $X'_{N-1}$ cannot be detected by a receiver. It is desirable to enable detection of such a loss at the receiver.

Figure 22:
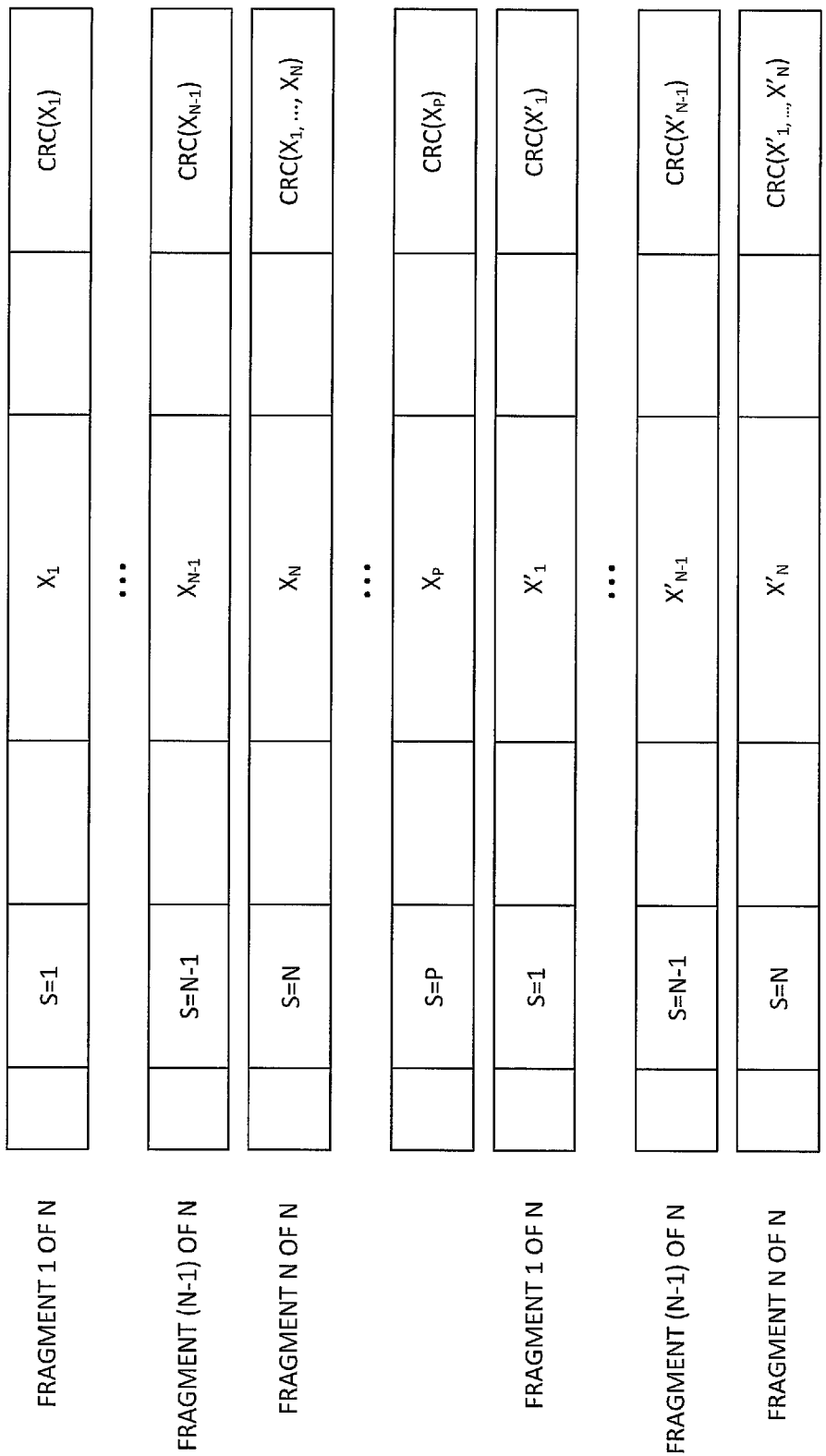
FIG. 22 illustrates another multiple message fragments.

Referring to FIG. 22, a technique to eliminate the potential effects of missing a series of message fragments may be accomplished by modifying the CRC of a last fragment to include all of the previous fragments of the series. For the last fragment, the CRC_32 value shall correspond to the CRC of the message re-assembled from the fragments.

Figure 23:
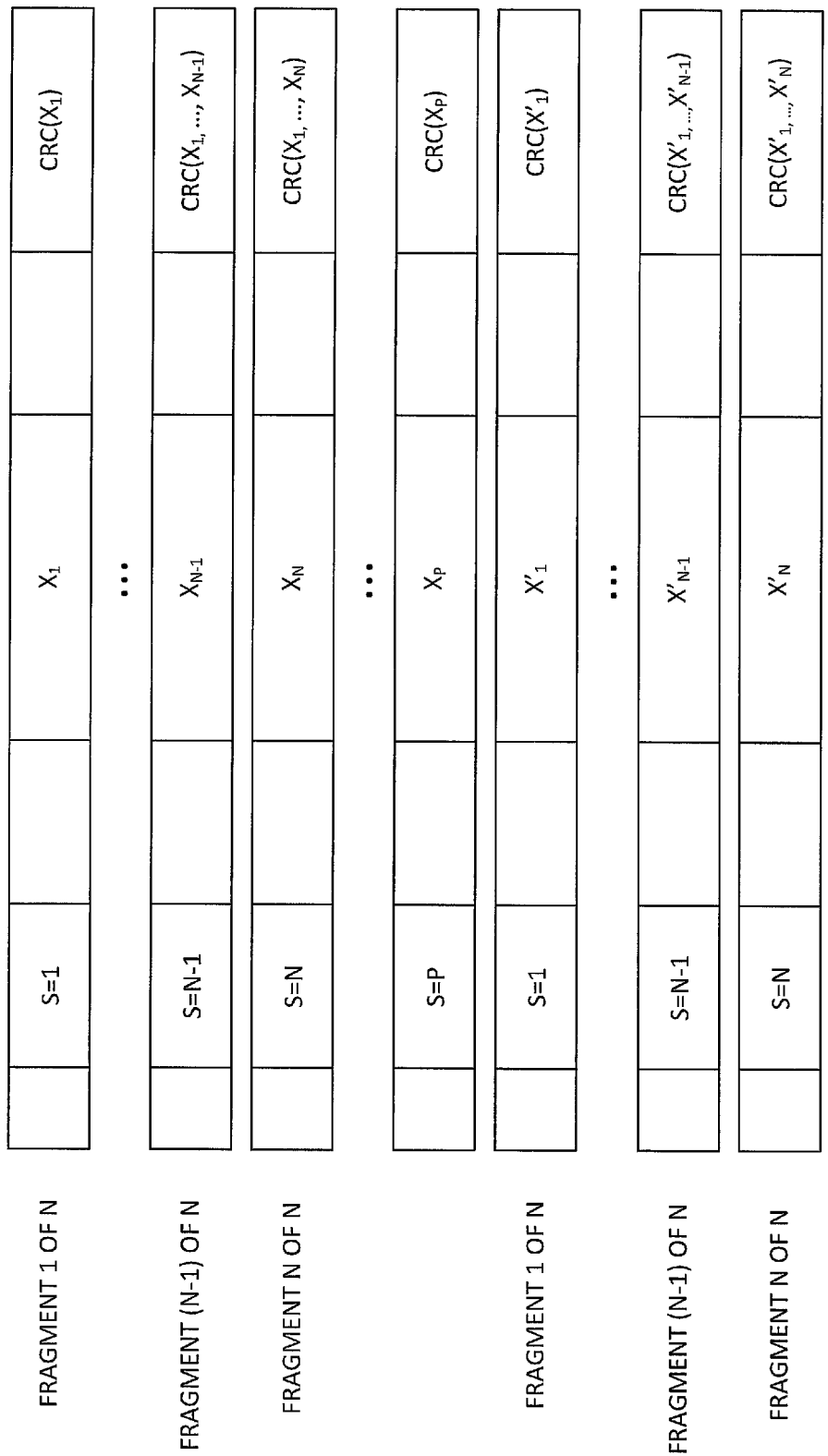
FIG. 23 illustrates another multiple message fragments.

Referring to FIG. 23, a technique to eliminate the potential effects of missing a series of message fragments may be accomplished by modifying the each CRC of a fragment to include all of the previous fragments of the series. For each fragment, the CRC_32 value shall correspond to the CRC of the message re-assembled from the fragments including and preceding the current fragment.

Figure 24:
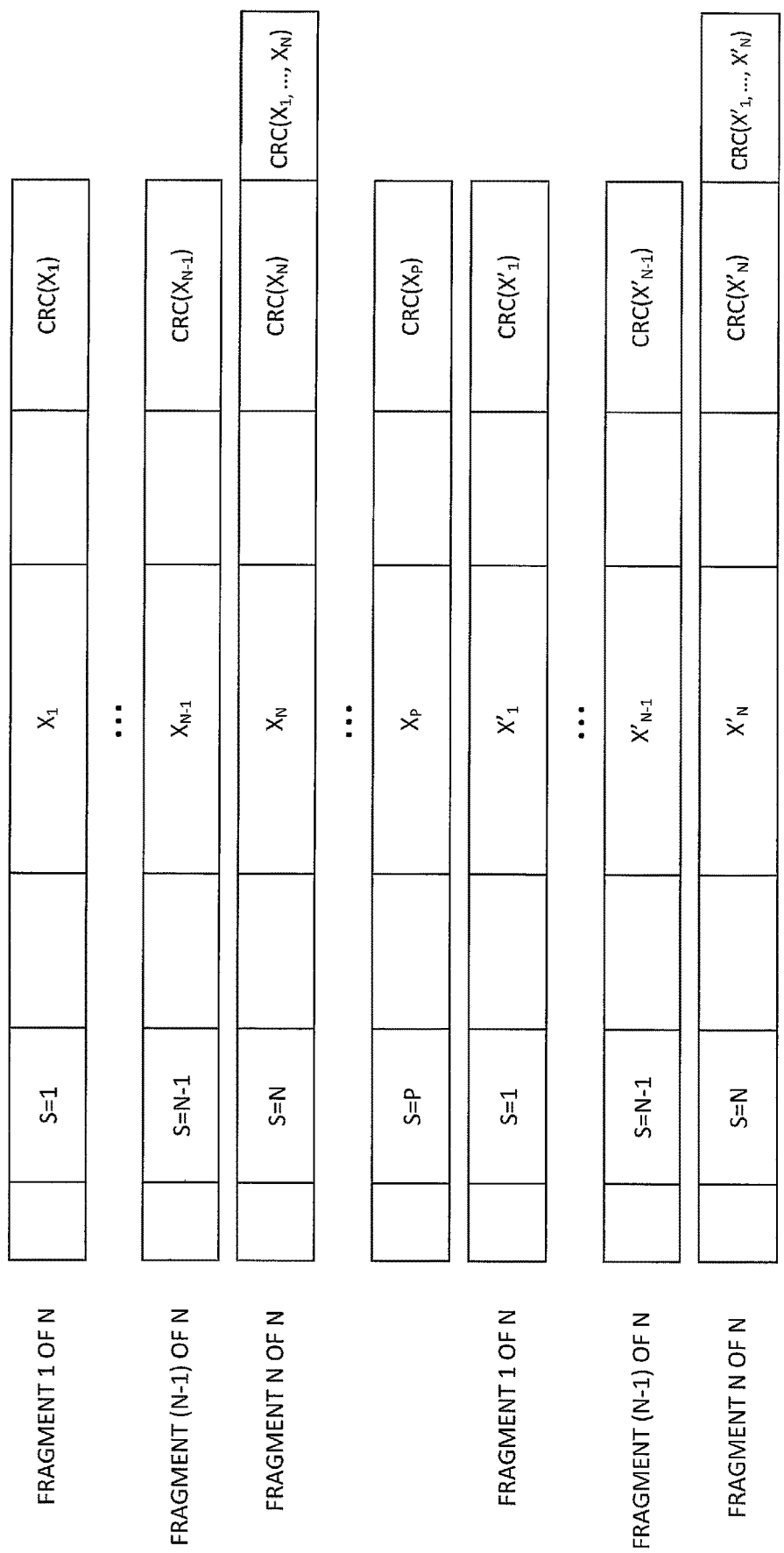
FIG. 24 illustrates another multiple message fragments.

Referring to FIG. 24, a technique to eliminate the potential effects of missing a series of watermarked messages may be accomplished by adding to the last fragment belonging to a group, a further CRC of a fragment to include all of the previous fragments of the series. The further CRC may not be included when the entire message is unfragmented. In an example, this further CRC may correspond to value of a syntax element message_CRC_32. In an example, this further CRC may correspond to unfragmented message. In an example, this further CRC may be used to validate the re-assembled message from the fragments. The further CRC_32 value shall correspond to the CRC of the message re-assembled from the fragments.

A watermark message fragment may consist of a fragment header, a fragment of the message data, some data for future extensions and fragment check-sum data. Table (1) below illustrates an example organization of the message fragment:

TABLE (1)

```
WatermarkMessageFragmentFields( ) {
    FragmentHeader( )
    FragmentOfMessageData( )
    FutureExtensionData( )
    FragmentCheckSum( )
}
```

The fragment header may contain length information that identifies the number of bits (or bytes) from a particular location (e.g. immediately following the length field) to another location within the message fragment (e.g. end of fragment check sum information). The fragment header may contain information about how many fragments the original message was partitioned into and an index indicating which of the parts is being carried within the current message fragment.

In an example the fragment check-sum may correspond to a 32-bit CRC of the bits from a particular location (e.g. start of fragment header) to another location within the message fragment (e.g. end of future extensions data information).

A watermark message fragment may consist of a fragment header, a fragment of the message data, some data for future extensions, fragment checksum data and a conditionally signaled checksum data for the entire message. Table (2) below illustrates an example organization of the message fragment:

TABLE (2)

```
WatermarkMessageFragmentFields( ) {
    FragmentHeader( )
    FragmentOfMessageData( )
    FutureExtensionData( )
    if (last fragment of a message made up of multiple fragments) {
        MessageCheckSum( )
    }
    FragmentCheckSum( )
}
```

Referring Table (2), the fragment header may contain length information that identifies the number of bits (or bytes) from a particular location (e.g. immediately following the length field) to the another location within the message fragment (e.g. end of fragment check sum information). A checksum corresponding to the entire unfragmented message may be sent for the last fragment of a message partitioned across multiple message fragments. The fragment header in Table (2) may contain information about how many fragments the original message was partitioned into and an index indicating which of the parts is being carried within the current message fragment. A determination on whether the fragment is the last fragment of a message partitioned across multiple message fragments can be made based on this information.

In an example the fragment number index corresponding to a partition is increased from 0 to (Number of Fragments−1) for the corresponding message partitions, In such an example when the condition: Fragment number index is equal to (Number of Fragments−1) and Number of fragments is not equal to 1, is true, then the checksum corresponding to the entire unfragmented message may be sent in the message fragment.

Alternatively, in such an example when the condition: Fragment number index is equal to (Number of Fragments−1) and Fragment number index is not equal to 0, is true, then the checksum corresponding to the entire unfragmented message may be sent in the message fragment. In an example the checksum corresponding to the entire unfragmented message may be a 32-bit CRC for the unfragmented message.

In an example the checksum corresponding to the entire unfragmented message may be a 32-bit CRC for the unfragmented message and select data from the fragment header within each corresponding message fragment.

In an example the checksum corresponding to the entire unfragmented message may be a 32-bit CRC for the unfragmented message data.

In an example, FutureExtensionData( ) in Table(1) and/or Table(2) may not contain any information and therefore require 0 bits.

In an example the checksums may be transmitted in unsigned most significant bit first format. It is to be understood that the CRC(x) may correspond to a 32-bit CRC of message x. It is to be understood that the CRC(x) may correspond to any suitable set of symbols (e.g., parity, syndrome) used to detect errors occurring in received values for x. $CRC(x_1, x_2, \ldots, x_n)$ is equal to the CRC(x) where x is obtained by concatenating $x_1, x_2, \ldots, x_n$.

The checksum or CRC value may be determined in any suitable manner for one or more of the fragments.

Figure 25:
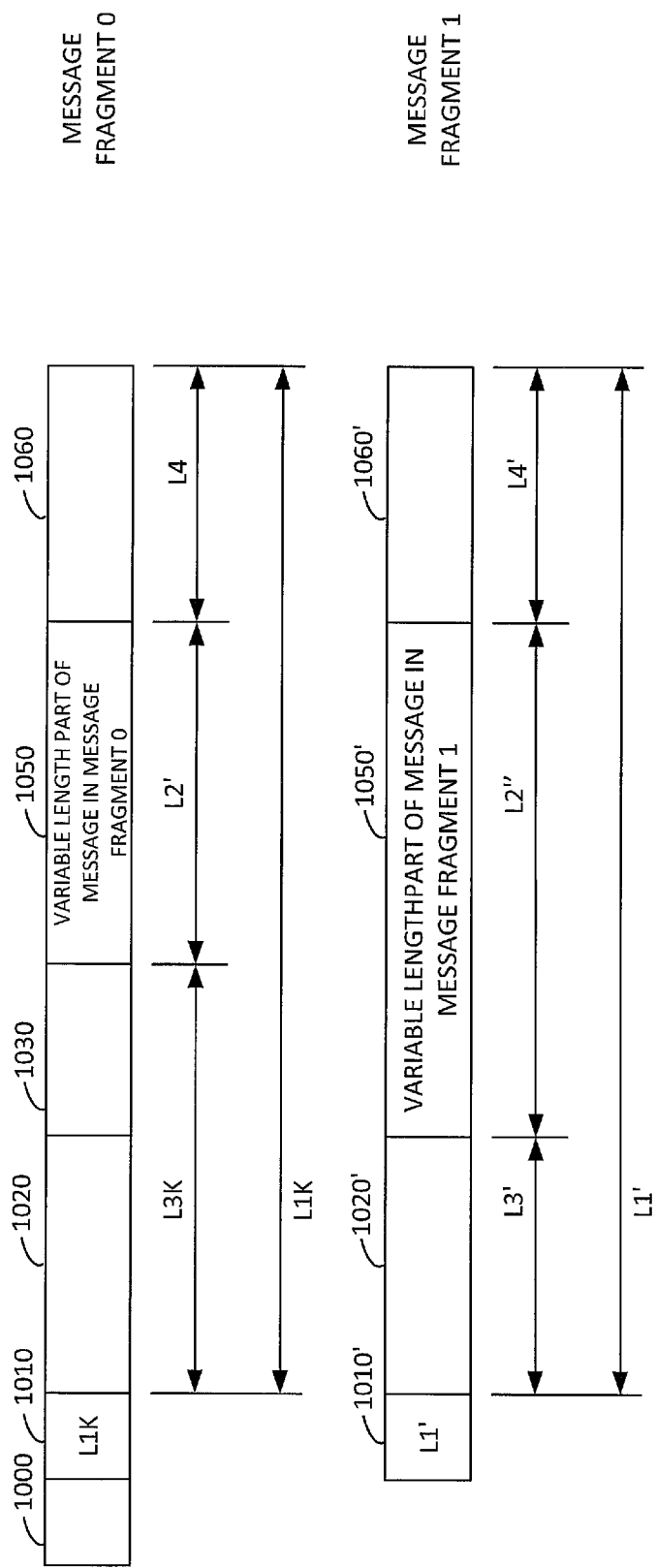
FIG. 25 illustrates another multiple message fragments.

Referring to FIG. 25, in another embodiment, a subsequent message fragment may omit the identification data, and use the identification data from the previous fragment. In an example the identification data may correspond to type of message which is signaled only for the first message fragment and inferred for the remaining message fragments belonging to a group.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for receiving information, the method comprising:
receiving two or more watermark message fragments corresponding to a complete message, wherein each watermark message fragment having a variable length includes:
(a) a fragment header including:
  (i) information identifying the watermark message fragment,
  (ii) length information specifying a number of bytes from the length information to an end of the watermark message fragment,
  (iii) fragment number information specifying an index number of a current message fragment, and
  (iv) last fragment number information specifying an index number of a last watermark message fragment of the two or more watermark message fragments,
(b) watermark message fragment data, and
(c) a first 32 bit Cyclic Redundancy Check,
wherein the last watermark message fragment includes a second 32 bit Cyclic Redundancy Check containing a Cyclic Redundancy Check value represented by CRC(x), wherein x is the complete message obtained by concatenating the two or more watermark message fragments, and
the second 32 bit Cyclic Redundancy Check is sent using an unsigned integer most significant bit first format.

2. The method of claim 1, wherein receiving the two or more watermark message fragments includes extracting each watermark message fragment from a respective picture.

* * * * *